(12) United States Patent
Walley et al.

(10) Patent No.: US 10,825,471 B2
(45) Date of Patent: Nov. 3, 2020

(54) VOICE ENERGY DETECTION

(71) Applicant: AVAGO TECHNOLOGIES INTERNATIONAL SALES PTE. LIMITED

(72) Inventors: John Walley, Ladera Ranch, CA (US); Beng Huat Chua, Singapore (SG); VamshiKrishna Yakkala, Bangalore (IN); Xin Jin, Irvine, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/942,693

(22) Filed: Apr. 2, 2018

(65) Prior Publication Data
US 2018/0293999 A1    Oct. 11, 2018

Related U.S. Application Data

(60) Provisional application No. 62/482,011, filed on Apr. 5, 2017.

(51) Int. Cl.
| | | |
|---|---|---|
| *G10L 25/84* | (2013.01) | |
| *G10L 25/21* | (2013.01) | |
| *G10L 15/22* | (2006.01) | |
| *G10L 15/18* | (2013.01) | |

(Continued)

(52) U.S. Cl.
CPC .......... *G10L 25/84* (2013.01); *G10L 15/1815* (2013.01); *G10L 15/22* (2013.01); *G10L 25/21* (2013.01); *G10L 25/18* (2013.01); *G10L 2015/088* (2013.01)

(58) Field of Classification Search
CPC ........ G10L 25/84; G10L 25/21; G10L 25/18; G10L 15/22; G10L 15/1815; G10L 2015/088; G10L 25/78; G10L 25/81; G10L 25/87; G10L 2025/783; G10L 2025/786; G10L 15/02; G10L 2015/223; G10L 2021/02166; G06F 3/167; H04R 29/004;

(Continued)

(56) References Cited

U.S. PATENT DOCUMENTS

| | | | | |
|---|---|---|---|---|
| 5,625,697 A | * | 4/1997 | Bowen | H04M 9/08 381/92 |
| 7,881,927 B1 | * | 2/2011 | Reuss | G10L 25/78 704/226 |
| 9,478,231 B1 | * | 10/2016 | Soman | G06F 1/3206 |

(Continued)

*Primary Examiner* — Andrew C Flanders
(74) *Attorney, Agent, or Firm* — Xsensus LLP

(57) ABSTRACT

A system uses a voice energy detection (VED) circuit along with a capture buffer for improved performance and lower power dissipation. With a VED assigned to each microphone in the system, combing the output of more than one VED to improve the detection probability or reduce the false alarm rate improves the post detection signal-to-noise ratio. One or more VED circuits are dynamically selected based on background energy and detection performance. Further, a digital VED algorithm dynamically changes the oversampling ratio (OSR) values and passband bandwidth as a function of the loudness of the background noise and desired signal levels. If the desired signal or noise is strong, then the OSR is reduced to save power. If desired speech is detected, then the OSR value increases to get the target SNR for the remaining audio processing needs.

17 Claims, 32 Drawing Sheets

(51) Int. Cl.
*G10L 15/08* (2006.01)
*G10L 25/18* (2013.01)

(58) Field of Classification Search
CPC ................ H04R 29/005; H04R 29/006; H04R 2201/40; H04R 25/43
See application file for complete search history.

(56) References Cited

U.S. PATENT DOCUMENTS

| | | | |
|---|---|---|---|
| 2003/0108214 A1* | 6/2003 | Brennan | H03H 17/0266 381/94.7 |
| 2004/0236571 A1* | 11/2004 | Laurila | G10L 25/87 704/210 |
| 2007/0265842 A1* | 11/2007 | Jarvinen | G10L 25/78 704/214 |
| 2010/0192033 A1* | 7/2010 | Zopf | H04L 1/1607 714/748 |
| 2012/0185248 A1* | 7/2012 | Sehlstedt | G10L 19/0204 704/233 |
| 2015/0117671 A1* | 4/2015 | Chen | H04L 12/1813 381/92 |
| 2016/0155443 A1* | 6/2016 | Khan | G06F 1/3203 704/275 |
| 2017/0076720 A1* | 3/2017 | Gopalan | G06F 3/167 |
| 2017/0263268 A1* | 9/2017 | Rumberg | G10L 25/81 |
| 2017/0358313 A1* | 12/2017 | Shih | G10L 21/0208 |
| 2018/0018964 A1* | 1/2018 | Reilly | G10L 15/02 |
| 2018/0108351 A1* | 4/2018 | Beckhardt | G10L 15/32 |
| 2018/0233136 A1* | 8/2018 | Torok | G10L 15/22 |
| 2018/0233137 A1* | 8/2018 | Torok | G10L 15/22 |
| 2018/0234765 A1* | 8/2018 | Torok | H04R 3/12 |
| 2018/0288104 A1* | 10/2018 | Padilla | H04L 65/1069 |
| 2019/0156818 A1* | 5/2019 | Piersol | G10L 15/08 |

\* cited by examiner

VOICE ENERGY DETECTION

CROSS-REFERENCE TO RELATED APPLICATION

This application claims the benefit of U.S. Provisional Application No. 62/482,011 filed Apr. 5, 2017, which is incorporated herein by reference in its entirety.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Voice energy detection (VED) can be used to detect the presence or absence of human speech. For example, VED can be used to detect speech coding, speech recognition, and the like.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to one or more aspects of the disclosed subject matter, a system can use a voice energy detection (VED) circuit along with a capture buffer for improved performance and lower power dissipation. With a VED assigned to each microphone in the system, combing the output of more than one VED to improve the detection probability or reduce the false alarm rate can improve the post detection signal-to-noise ratio. One or more VED circuits can be dynamically selected based on background energy and detection performance. Further, a digital VED algorithm can dynamically change the oversampling ratio (OSR) values and passband bandwidth as a function of the loudness of the background noise and desired signal levels. If the desired signal or noise is strong, then the OSR can be reduced to save power. If desired speech is detected, then the OSR value can increase to get the target SNR for the remaining audio processing needs.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
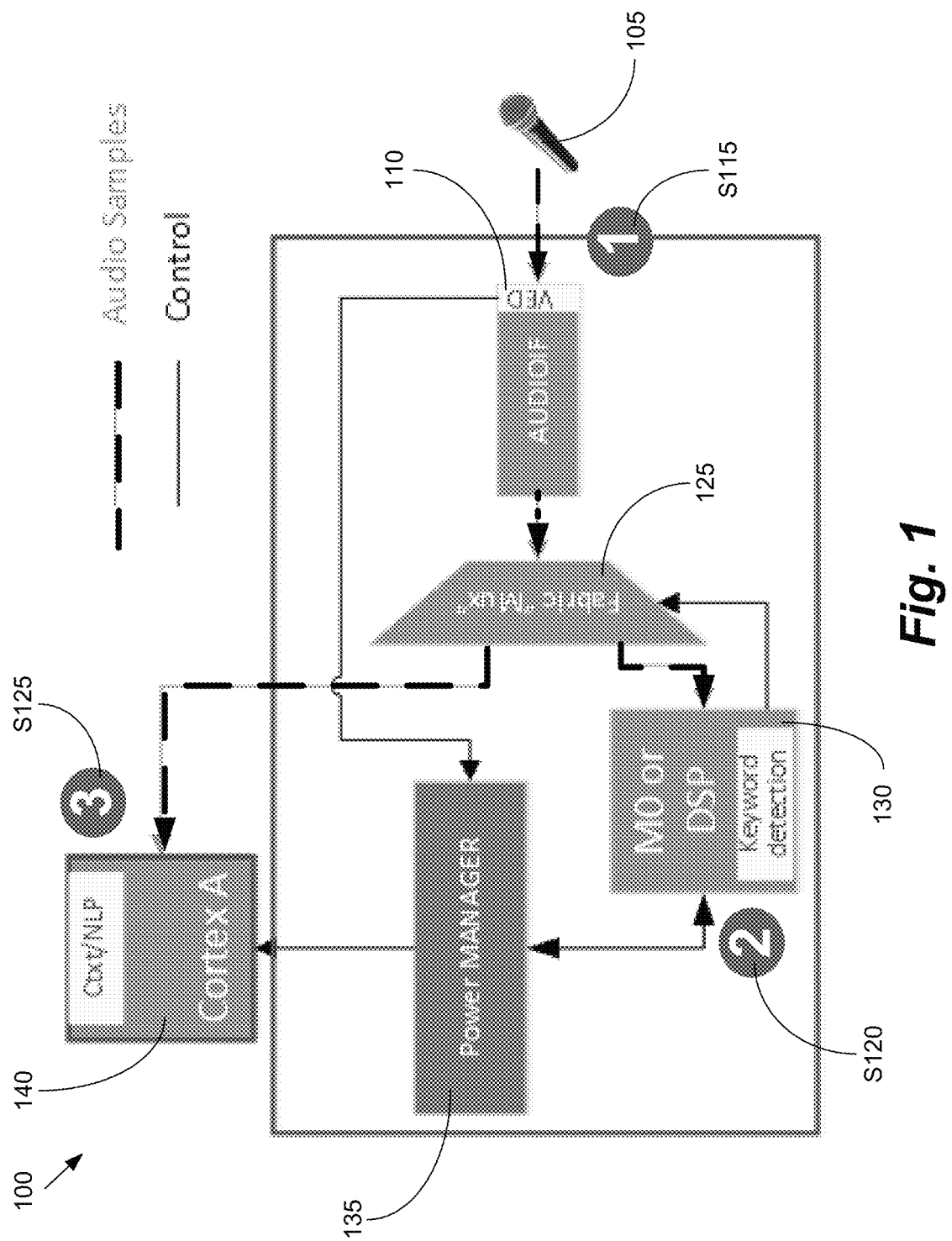
FIG. 1 illustrates an overview of a VED system according to one or more exemplary aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

Generally, in one or more aspects of the disclosed subject matter, a VED system can include a VED assigned to each microphone in the system, combining the output of more than one VED to improve the detection probability, reduce the false alarm rate, and/or improve the post detection signal-to-noise ratio (SNR). The VED system can dynamically select one or more VED circuits based upon background energy and detection performance.

The VED system can include several advantages. For example, as further described herein, the system can use a VED circuit along with a capture buffer for improved performance and lower power dissipation.

Additionally, the system can adapt an electret condenser microphone (ECM) interface and bias generators to go from VED mode to normal audio capture mode. As a result, the system can dynamically change Rbias and Vbias at the same time.

Further, a plurality of VED algorithms can be used with the system. For example, a VED algorithm can include slope delta modulation filtering. Additionally, VED algorithm can use multiple sub bands of different widths, center frequencies, and scale factors where each sub band is compared against another sub band. The differences can then be compared against detection thresholds. Further, A VED algorithm can combine both techniques to improve performance. In other words, the combination of VED algorithms can be configured to perform slope delta modulation filtering, compare each sub band in a plurality of sub bands to any other sub band in the plurality of sub bands, the sub bands having different widths, center frequencies, and scale factors, and compare differences from each sub band comparison with a detection threshold, and identify a speech presence when there is a difference in speech energy between the sub bands.

The VED system can also include low power energy monitoring. For example, an external CPU can wake up periodically and adjust the VED thresholds and input levels based on an average energy level.

Additionally, the VED system can adjust the input level and detection thresholds based upon false alarm rates for the VED function.

A CPU can periodically wake up the normal audio paths to monitor noise and signal levels to calibrate the VED thresholds. Further, the CPU can periodically monitor the background noise spectra and or desired talker speech spectra and adjust the VED sub band filters to maximize probability of wake word detection or minimize false alarm rates. A wake word can trigger functionality (e.g., interactive functionality to play music, use an electronic personal assistant, interact with Internet of Things devices, etc.) of an electronic device.

A digital VED algorithm can dynamically change the oversampling ratio (OSR) values and passband bandwidth as a function of the loudness of the background noise and/or desired signal levels. If the desired signal or noise is strong, then the OSR can be reduced to save power. If desired speech is detected, then the OSR value can increase to get the target signal-to-noise ratio (SNR) for the remaining audio processing needs.

FIG. 1 illustrates an overview of the VED system 100 according to one or more exemplary aspects of the disclosed subject matter. Generally, the VED system 100 can include a microphone 105, a VED 110, a multiplexer 125, a keyword detection block 130, a power manager 135, and a contextual/NLP block 140.

More specifically, the design can include low power wake-on-word processing capability. The low power wake-on-word processing capability can be done in a 3 step process. Step 1 (as indicated by S115): Detect voice energy from a microphone 105 via voice energy detection using predetermined hardware (e.g., VED 110) in the system. Step 2 (as indicated by S120): Keyword Detection—Detect a pre-determined wake word (e.g., "Hello," "Hello, Computer," etc.) in a Cortex-M0 (CM0) of DSP block (e.g., keyword detection block 130) with the normal microphone paths. Step 3 (as indicated by S125): NLP—Contextual and/or Natural Language processing in a contextual/NLP block 140. This can extend into provider's cloud processing.

Generally, VED can be used for power savings. VED can wake up the keyword detect circuits when there is enough energy in the selected microphones. This can be for an indoor audio environment with 2 meter target range, for example.

Advantages can include low cost, low power, and similar or better performance.

Table 1 includes exemplary operations information.

TABLE 1

| Key Specifications | Requirement | Comment |
|---|---|---|
| Power Supply | 1.8 V digital | Digital supply, +/−3%? |
| Power consumption | <30 uW | For VED circuits only. Does not include microphone bias, voltage generation, clock generation. |
| Clock | 32 KHz | <<5% tolerance, <100 ns cycle jitter. |
| Microphone input support | 3x ECM/Analog MEM, 4x Digital MEM | 4x Digital MEM support via two 2:1 multiplexed input ports. |
| Start-up time | <1 ms | For the circuits to power up and produce the right outputs. Audio detection time is also around 1 ms. |
| Number of VED's | 2 analog, 2 digital | Dual simultaneous AVED, dual digital with output combining. |
| Voice Detection | >=94% | MIWOK r1.0 database with <=7% false alarm rate. Same or better than Dolphin's design. |
| Area per VED | ~0.02 mm^2 | Existing VED in Tahiti is ~0.014 mm^2. Digital will increase this. |
| Additional enhancements | 1. Additional tuning capability 2. AGC support | Add additional tuning to adapt performance to environment and wake on word. Add energy monitoring and AGC support - loop closed in CM0. |

Figure 2:
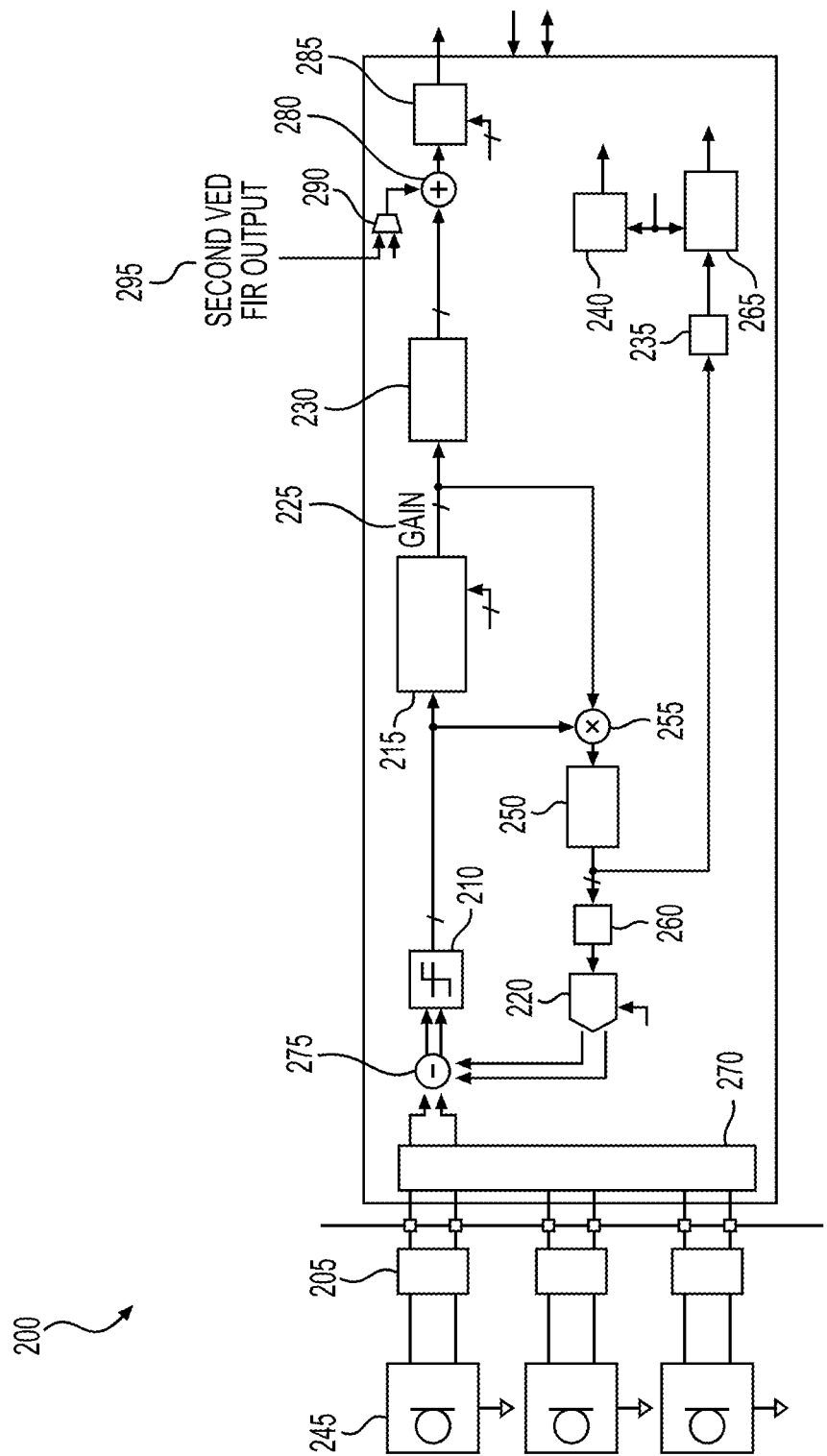
FIG. 2 illustrates an exemplary analog voice energy detection (AVED) architecture according to one or more aspects of the disclosed subject matter.

FIG. 2 illustrates an exemplary analog voice energy detection (AVED) architecture 200 according to one or more aspects of the disclosed subject matter. The AVED architecture 200 can include an external AVED microphone input filter 205 (which can represent one or more AVED microphone input filters), a comparator 210, an FSM 215, an AVED DAC 220, an AVED gain and integrator 225, one or more analog MEM and ECMs 245 (which can represent one or more analog MEM and ECMs), a first accumulator 250 positioned between a multiplier 255 and a delay 260, slope delta modulator architecture, additional register controls for added flexibility, post digital filter 230, leaky gain integrator, multi VED combiner, threshold detection and automatic gain control (AGC) support circuitry (e.g., see FIG. 10) including a second accumulator 265 positioned between an absolute value function 235 and up counter 240, a multiplexer 270 positioned between the AVED microphone input filter(s) 205 and a subtractor 275, and an adder 280 positioned between the post digital filter 230, a threshold block 285, and a second multiplexer 290 receiving input from a second VED finite impulse response (FIR) output 295.

In one implementation, operation of the AVED can include one of three microphone input signals being selected from one of the three microphones 245. It should be appreciated that changing the multiplexer (mux) can make the output unreliable for 8-32 clocks, for example, until the state machine can settle. Additionally, DC offset may also need to settle. The selected microphone signal can be compared against a digital-to-analog converter (DAC) signal reference (subtraction) from the AVED DAC 220. Comparator output E {−1,+1} is directly fed back into the finite-state machine (FSM) 215 block. FSM counts consecutive number of samples that are the same. In one implementation, if the last N samples are the same, increase the gain by a factor of 2 (although it may depend on lookup table (LUT)). If any of the past N samples differ, decrease the gain by a factor of 2 (similarly, may depend on LUT). Gain is saturated at both the low and high end. If the comparator output is a consecutive stream of "+1"s or "−1"s, then the loop is not tracking the input, therefore loop gain should be increased. If the output is toggling between values, then the loop is tracking the input, and the loop gain should be decreased. Or if the output is toggling, then there is possibly a high frequency signal. Output from the comparator 210 is multiplied by the FSM gain and accumulated. Output from the accumulator 250 is input to the DAC. The DAC 220 should act on the input in the next clock cycle for minimum delay.

Figure 3:
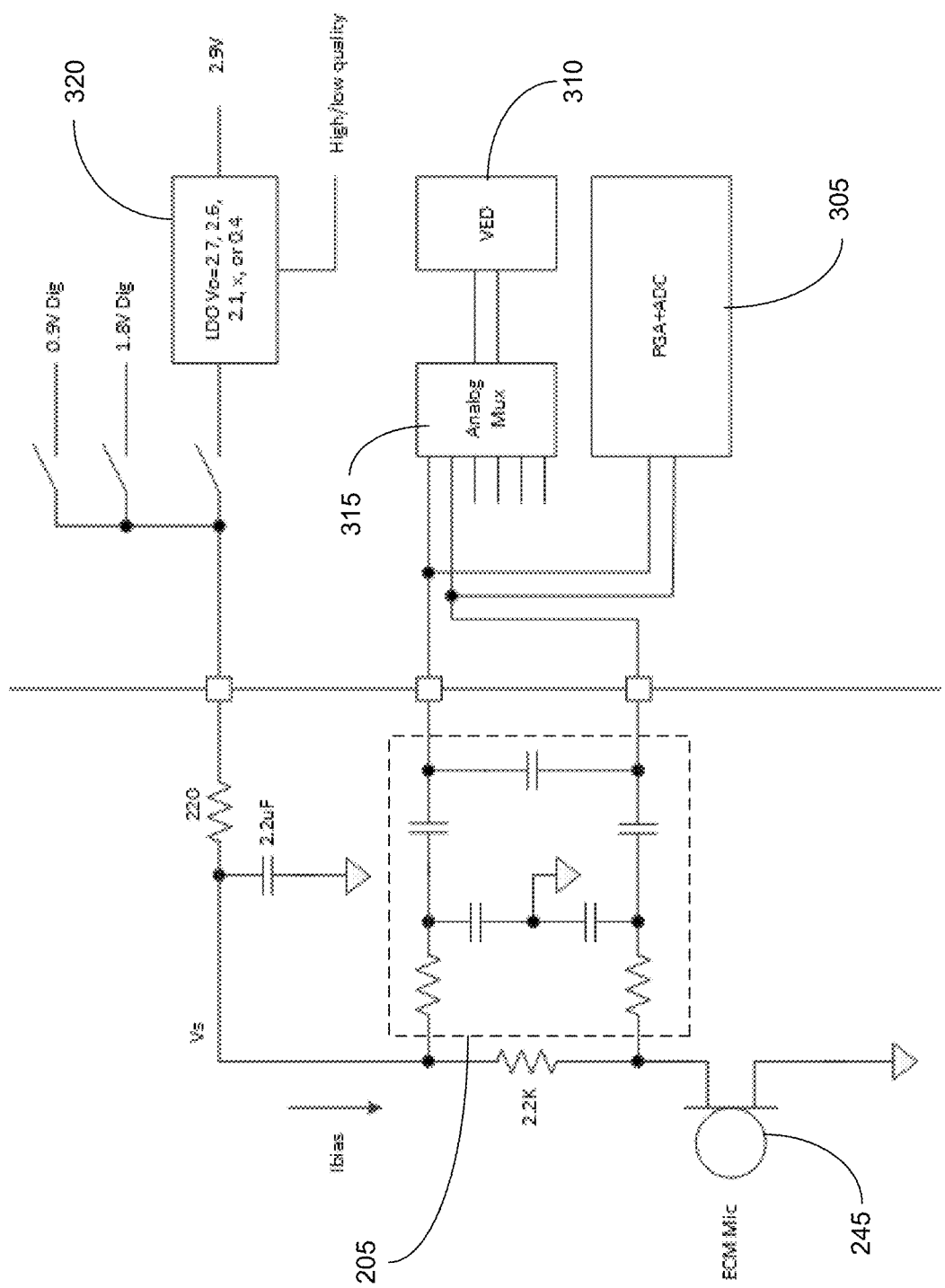
FIG. 3 illustrates an exemplary external AVED microphone input filter according to one or more aspects of the disclosed subject matter.

FIG. 3 illustrates an exemplary external AVED microphone input filter 205 according to one or more exemplary aspects of the disclosed subject matter. The AVED microphone input filter 205 can be connected to an ECM microphone (e.g., ECM microphone 245) externally, as well as being connected to components including a programmable gate array with an analog digital convertor (PGA+ADC) 305, a VED block 310, an analog multiplexer 315, and a low drop out regulator 320. In one implementation, the VED microphone input signal includes a low pass filter (LPF) and a high pass filter (HPF). This can be done externally, for example, when applied to an electric condenser microphone (ECM) or an analog microelectromechanical systems (MEMs) (e.g., microphone 245). Additionally, a single pole resistor-capacitor (RC) can be used. In one implementation, the LPF can be a 3 dB bandwidth between 8 KHz and 12 KHz, and the HPF can be 50 Hz. The microphone bias supply can be optimized for lowest power dissipation for the microphone. For ECM, 1.8V digital is possible, and external Rbias can be adjusted using the low drop out regulator (LDO) in a low power and/or lower voltage mode. Also microphone bias noise can be kept at chip output<1-2 mV RMS (i.e., integrated 0.1-32 KHz). For MEMs, the 1.8V from digital can be used. Additionally, avoiding switching transients on microphone bias can prevent more settling time needed for wake on word processing.

Figure 4:
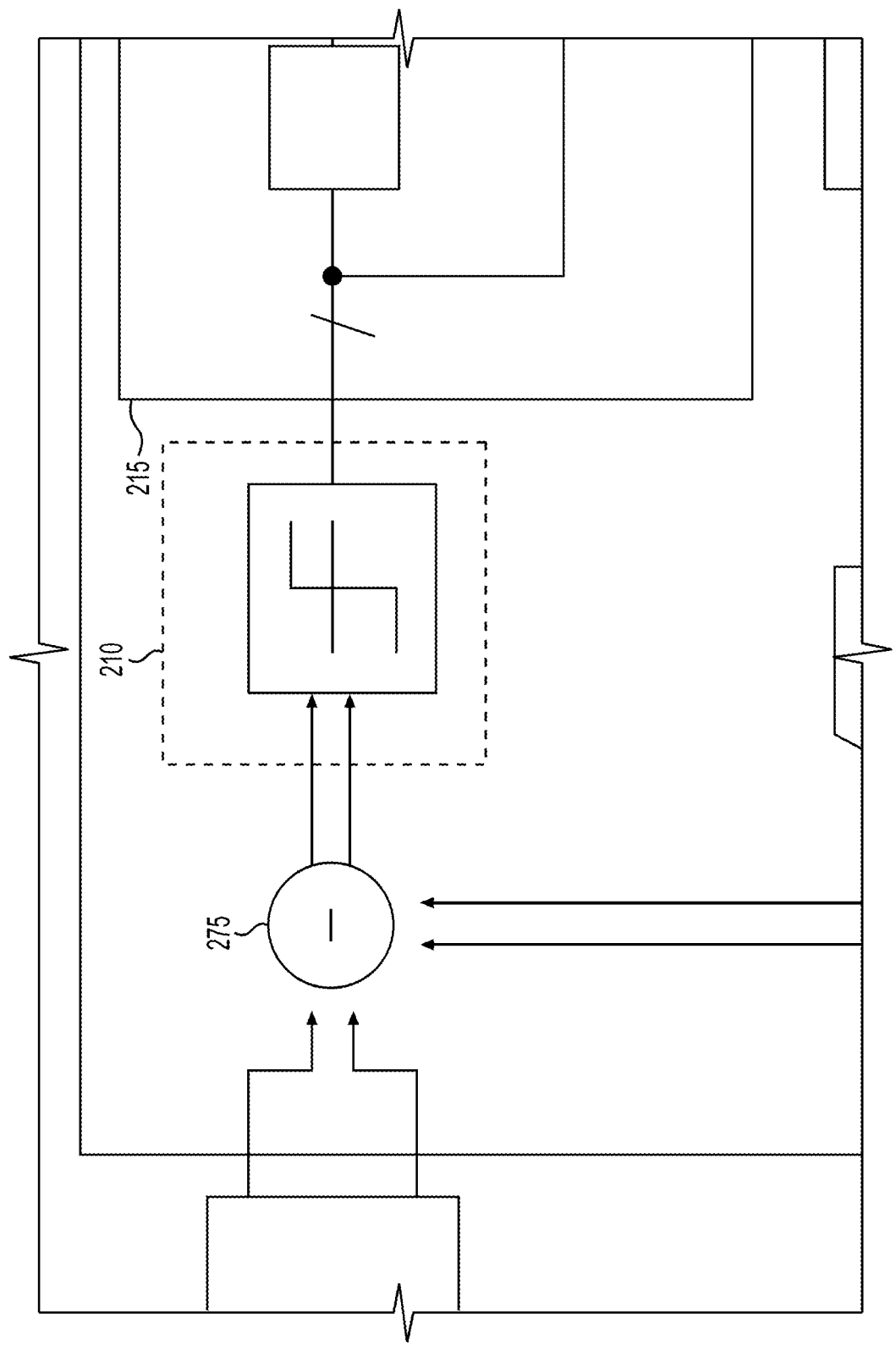
FIG. 4 illustrates an AVED comparator according to one or more exemplary aspects of the disclosed subject matter.

FIG. 4 illustrates an AVED comparator 210 according to one or more exemplary aspects of the disclosed subject matter. The AVED comparator 210 can be positioned between the subtractor 275 and the FSM 215. Using the AVED comparator 210, the voltage offset and input referred noise can be kept low. In one implementation, the microphone speech input signal amplitude can be 100 uV RMS so noise should be small in comparison. An 8 uV RMS input referred comparator noise can be targeted. Additionally, the offset voltage should be low. The design is inherently robust to some DC offsets, and DC offset can be kept in the range of the DAC (e.g., 9.6 mV with 75 uV least significant bit (LSB)) but drops when equivalent LSB is reduced. Target FS range is <10% of DAC.

Figure 5:
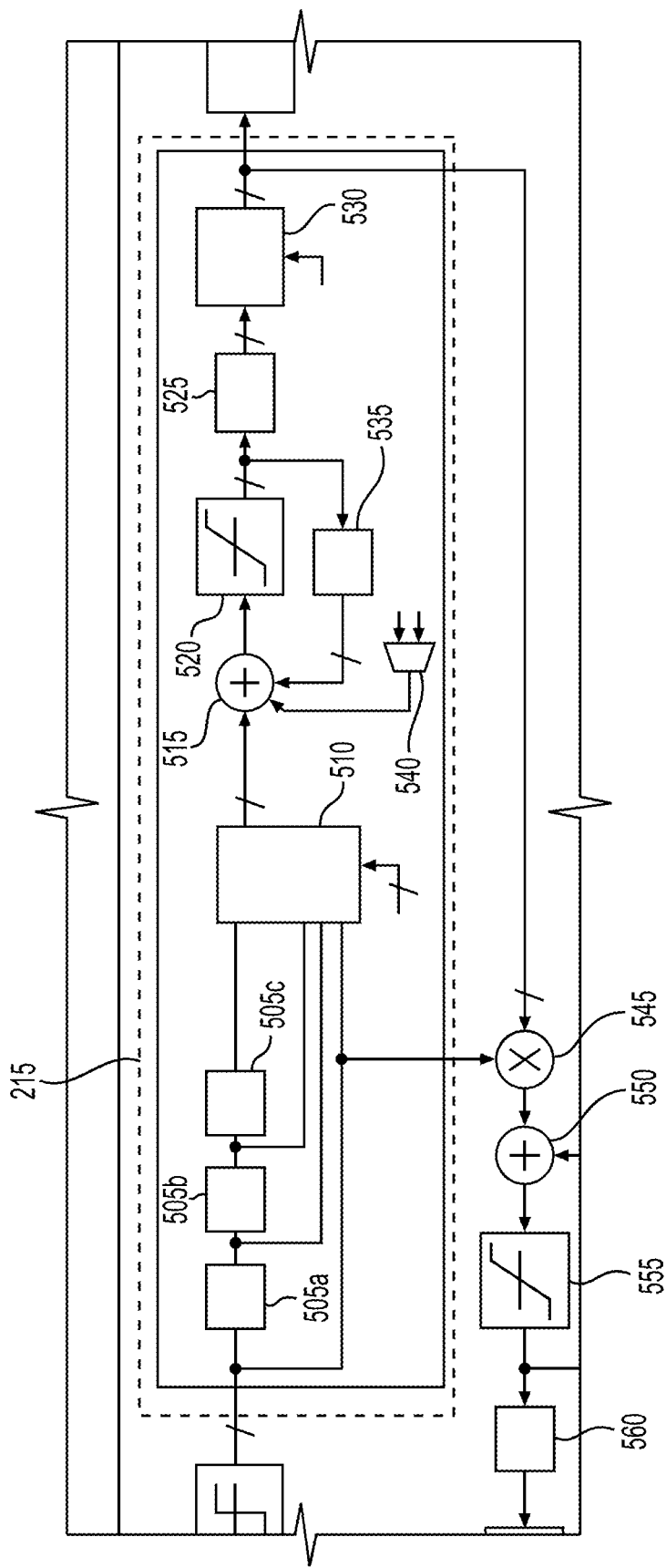
FIG. 5 illustrates an exemplary AVED finite state machine (FSM) according to one or more aspects of the disclosed subject matter.

FIG. 5 illustrates an exemplary AVED FSM 215 according to one or more aspects of the disclosed subject matter. Generally, the AVED FSM 215 can include a first delay 505a, a second delay 505b, and a third delay 505c such that signals delayed 0, 1T, 2T, and 3T, respectively, reach a match logic block 510. Additionally, the AVED 215 can include a first adder 515, a first saturation block 520 keeping sample values between +6 and 0, a round block 525, a look up table (LUT) 530, a fourth delay 535, and a multiplexer 540. Additionally, the AVED FSM 215 can be connected to additional components including a multiplier 545, a second adder 550, a second saturation block 555 keeping sample values between +127 and −127, and a fifth delay 560. Using the AVED FSM 215, selection can include N=2, 3, or 4 matches for the gain to increase with a 32 KHz clock. However, N=2 is most likely to be used. Additionally, using the AVED FSM 215 would make the Look Up Table (LUT) 7 bit unsigned coefficients programmable rather than fixed for extra flexibility, and only the middle values need to be programmable as a result. Additionally, 3 bits need to be added to the gain integrator (e.g. 3 fractional bits), and a negative 0.125 needs to be added to the adder (leaky integrator) which uses the extra bits. Accordingly, round logic needs to be added to get rid of the fractional bits for the LUT. In on implementation, the start-up delay until the output trigger can be asserted (i.e., circuit settling time), can be fixed to 32 clocks, for example.

Figure 6:
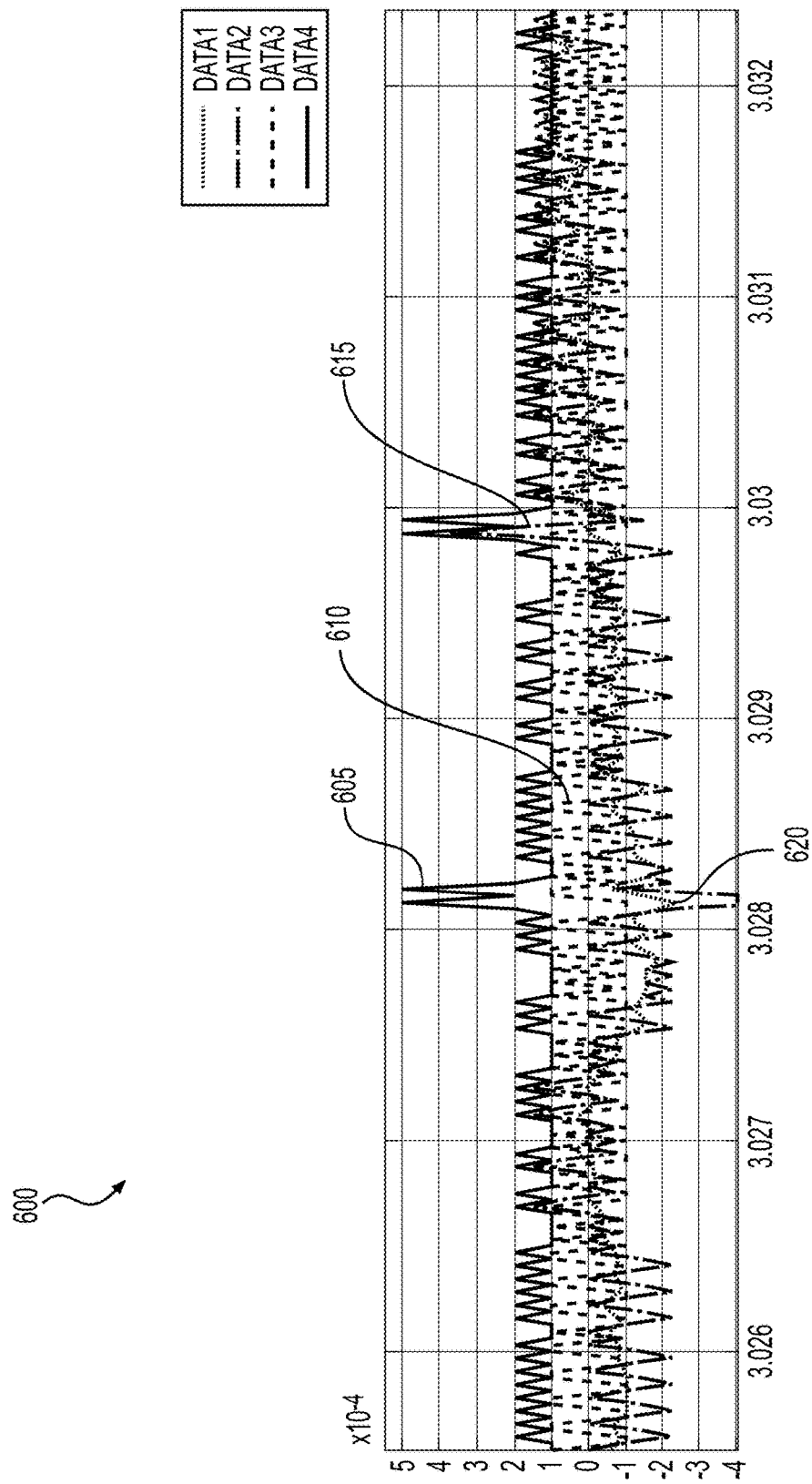
FIG. 6 is an exemplary simulation output according to one or more aspects of the disclosed subject matter.

FIG. 6 is an exemplary simulation output according to one or more aspects of the disclosed subject matter.

Data 605 corresponds to FSM Gain output (LUT output) *1/10000.

Data 610 corresponds to FSM Din*1/10000.

Data 615 corresponds to audio input.

Data 620 corresponds to DAC output.

For example, when N=2 (e.g., con_sel[2:0]=0), DAC LSB=75 uV, and gain integrator offset=0.

Figure 7:
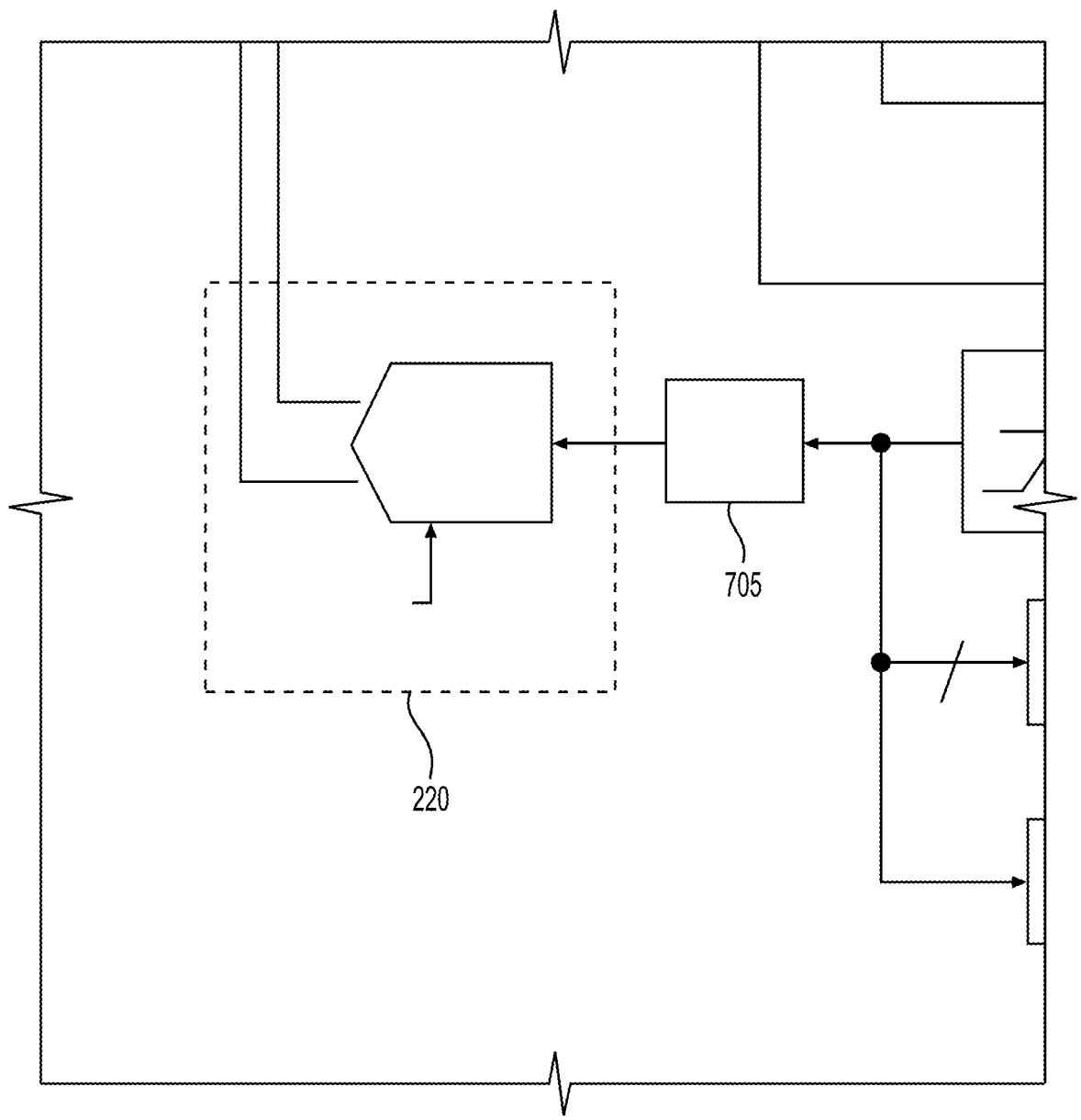
FIG. 7 illustrates an exemplary AVED digital-to-analog convertor (DAC) according to one or more aspects of the disclosed subject matter.

FIG. 7 illustrates an exemplary AVED DAC 220 according to one or more aspects of the disclosed subject matter. The AVED DAC 220 can be connected to a delay 705, for example. In one implementation, a single 20 dB gain step may not be necessary. Rather, a modifying gain step can be configured so that there are more gain steps and more resolution.

For example, the following LSB equivalent options may be used:

First, a 75 uV nominal can be used, and gain can be adjustable over greater than +/−6 dB in less than or equal to 2 dB steps, which can correspond to a minimum adjustment amount. As a result, the gains steps can correspond to approximately 38 uV, 48 uV, 60 uV, 75 uV, 94 uV, 117 uV, 147 uV, for example.

In one implementation, the gain will be set by an AGC algorithm in the CM0. Key specifics of the AGC algorithm include integral nonlinearity as less than or equal to 3 LSB, differential nonlinearity as less than or equal to ¼ LSB, a DAC DC offset as less than or equal to 10% of full scale range (FSR), and output noise should be much less than 8 uB RMS.

Figure 8:
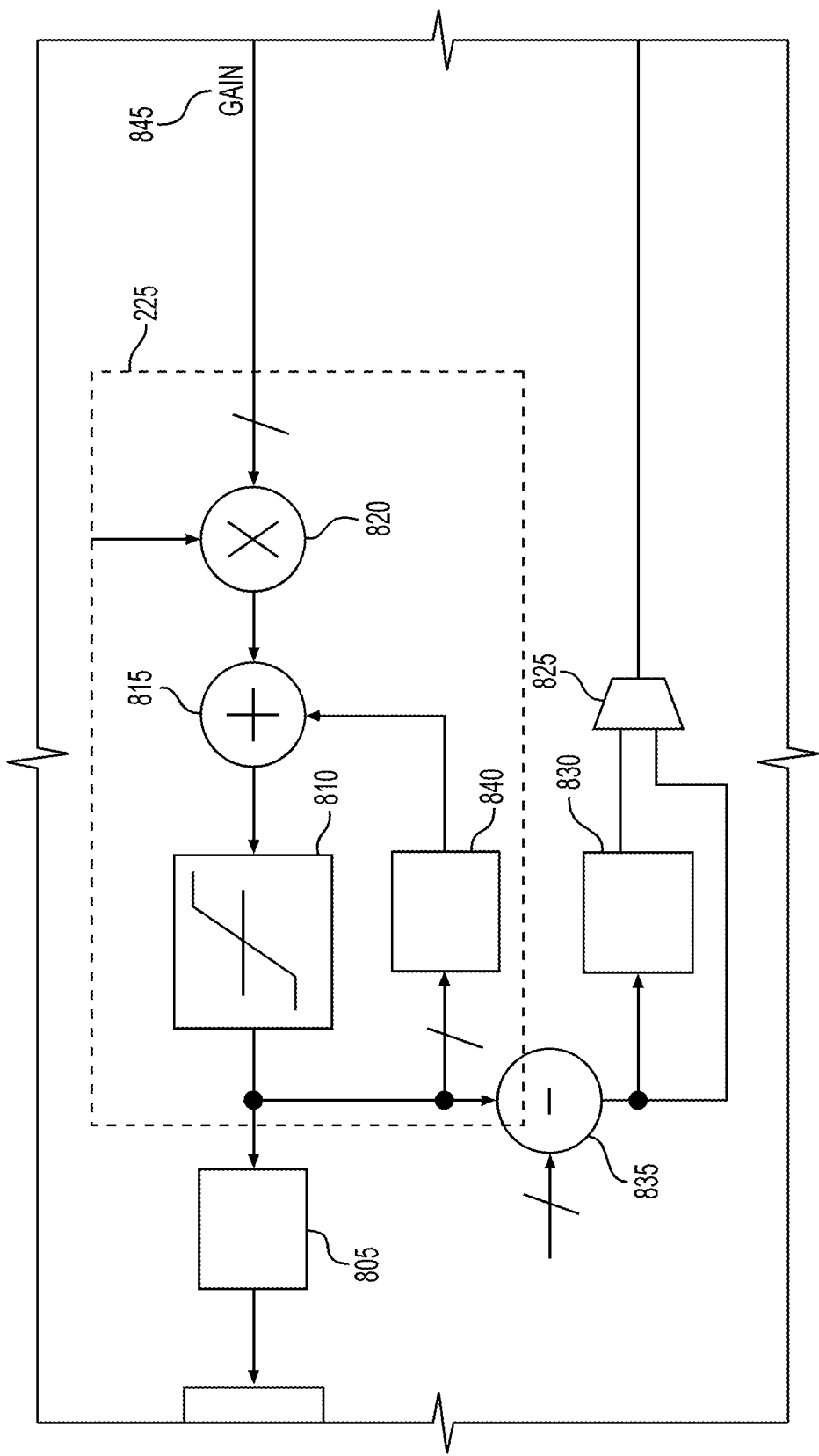
FIG. 8 illustrates an exemplary AVED gain and integrator according to one or more aspects of the disclosed subject matter.

FIG. 8 illustrates an exemplary AVED gain and integrator 225 according to one or more exemplary aspects of the disclosed subject matter. Generally, the AVED gain and integrator 225 includes various components including a saturation block 810 keeping sample values between +127 and −127, an adder 815, a multiplier 820, and a first delay 840. Additionally, the AVED gain and integrator 225 can be connected to additional components including a subtractor 835, an absolute value function block 830, a multiplexer 825, and a second delay 805.

In one exemplary implementation, the AVED gain and integrator 225 includes a 7 bit gain 845 from the FSM LUT. Next, gain*input can be integrated and saturated at +/−127 for the DAC.

Figure 9:
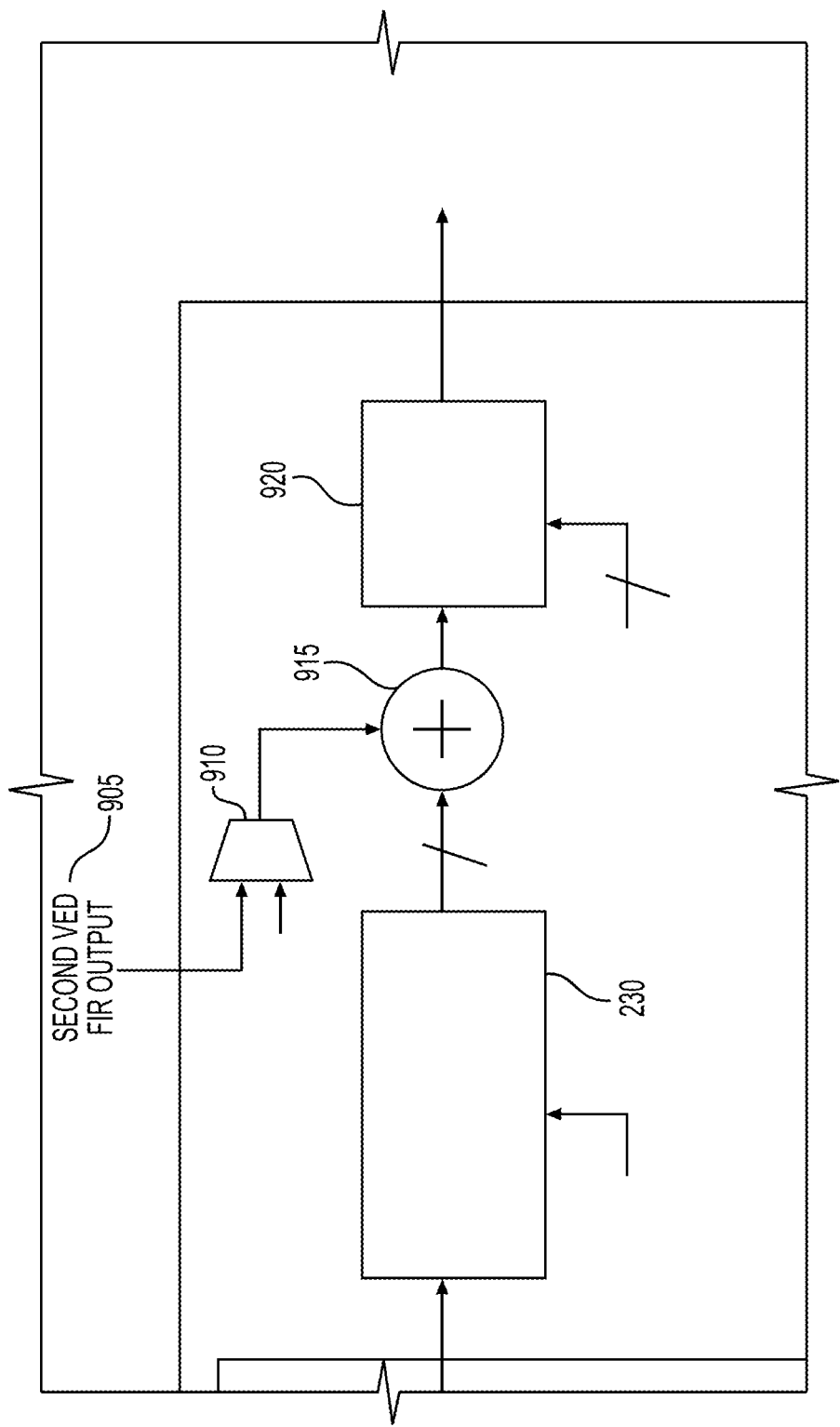
FIG. 9 illustrates an exemplary AVED post digital filter according to one or more aspects of the disclosed subject matter.

FIG. 9 illustrates an exemplary AVED post digital filter 230 according to one or more aspects of the disclosed subject matter. Generally, the AVED post digital filter 230 can be connected to an adder 915 connected to a multiplexer 910 receiving input from a second VED FIR output 905. Additionally, the adder 915 can be connected to a threshold block 920. In one implementation, the post digital filter 230 applies a low pass response to the LUT output and then compares the output to a programmable threshold. The post digital filter 230 can be a finite impulse response (FIR) "moving average" type that integrates the last "m" samples including the most recent as show in Equation 1.

$$y[n]=\{x[n]+x[n-1]+x[n-2]+x[n-m-1]\}*1/m \qquad \text{Equation 1}$$

In Equation 1, "m" is programmable to be equal to 1, 2, 4, or 8.

In one implementation, the digital filter output goes to an adder which will allow for the option to combine another VED output (e.g., second VED FIR output 905) to get some gain if the noises are uncorrelated. The lower 8 bits can be used as a minimum. The adder output is compared against a programmable threshold to generate a wakeup trigger which will wake up the CM0 and other wake-on-word circuits. The programmable threshold should cover the lower 8 bits as a minimum.

Figure 10:
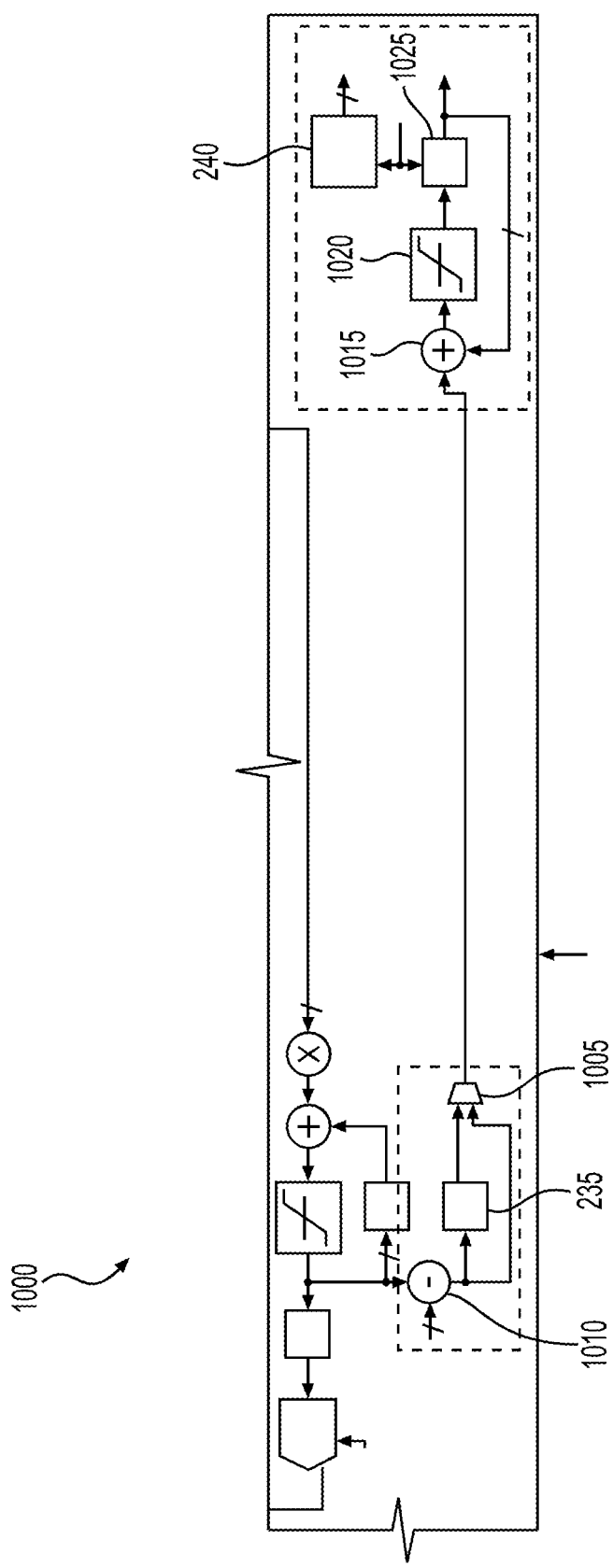
FIG. 10 illustrates an exemplary AVED automatic gain control (AGC) support according to one or more aspects of the disclosed subject matter.

FIG. 10 depicts AVED automatic gain control (AGC) support 1000 according to one or more aspects of the disclosed subject matter. Generally, the AVED AGC support 1000 includes an absolute value function block 235 positioned between a multiplexer 1005 and a subtractor 1010. Additionally, the AVED AGC support 1000 can include an adder 1015, a saturation block 1020 keeping sample values between +2^^22 and 0, a delay 1025, and an up counter 240. In one implementation, to support AGC type functionality and ambient noise estimation in the CM0, additional circuitry can be included to generate a useful metric. For example, the DAC integrator output energy can be accumulated. This can be done with an absolute value function (e.g., the absolute value function block 235). In one implementation, for simplicity, the absolute value function block 235 can combine with the accumulator adder "carry input" and added XOR function. Additionally, accumulating the DAC integrator output energy includes an integrator that is sized to allow the CM0 to sleep for at least 1 second at a time, an up counter (e.g., the up counter 240) which the CM0 can read to determine the number of accumulated samples, and estimating DC offset and subtracting this out (via subtractor 1010) before energy detection is done. For example, a mux 1005 is configured to allow the energy integrator to measure the average DAC input (which is the DC offset) or the average minus a DC offset (audio energy).

Figure 11:
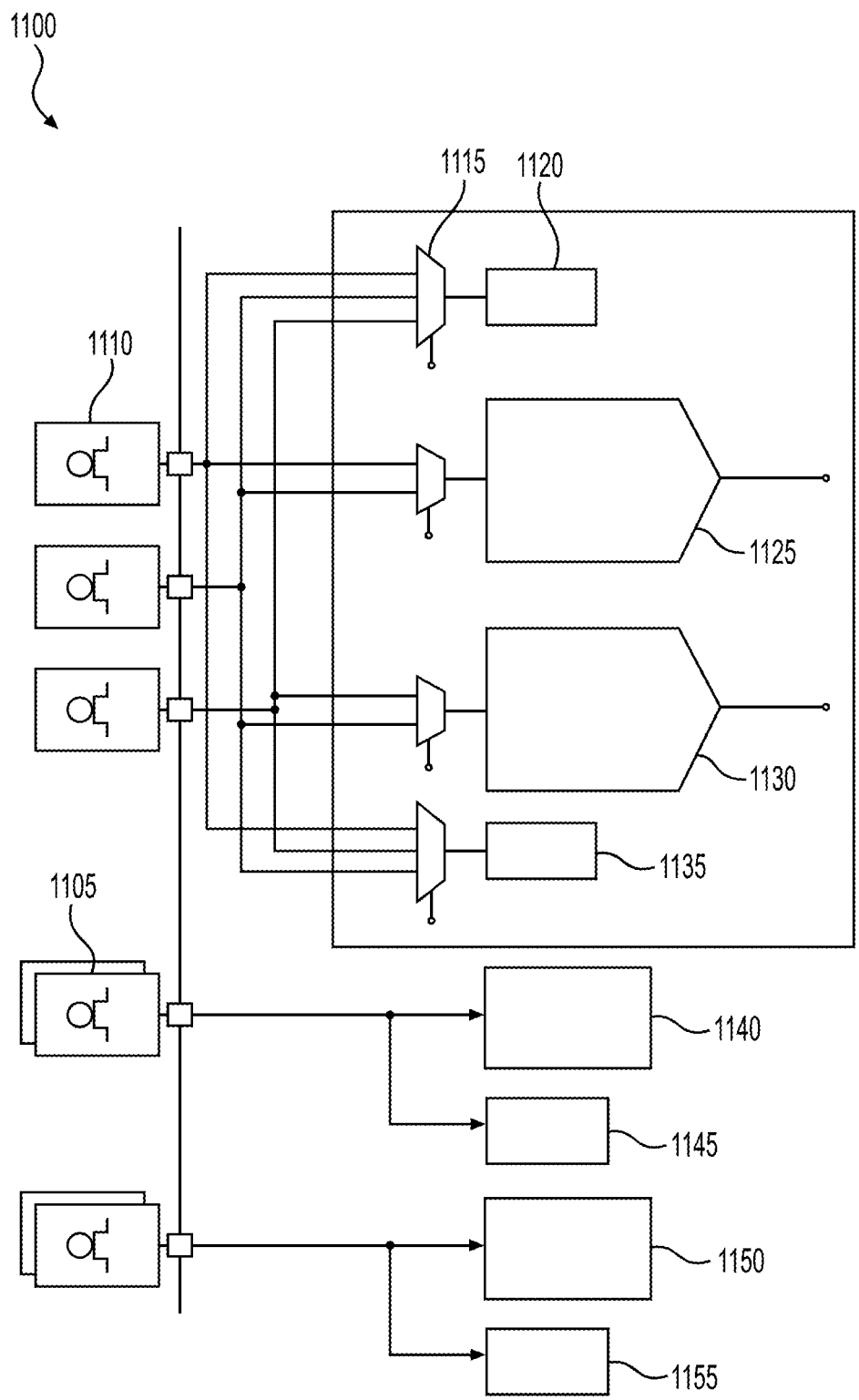
FIG. 11 illustrates an AVED and digital voice energy detection (DVED) system according to one or more exemplary aspects of the disclosed subject matter.

FIG. 11 depicts an AVED and digital voice energy detection (DVED) system 1100 according to one or more aspects of the disclosed subject matter. Generally, the system 1100 can include digital MEM microphone 1105 representing one or more digital MEM mics, a microphone 1110 representing one or more mics, a multiplexer 1115 representing one or more multiplexers, a VED1 1120 connected to a first multiplexer, a first PGA+ADC 1125 connected to a second multiplexer, a second PGA+ADC 1130 connected to a third multiplexer, a VED2 1135 connected to a fourth multiplexer, a first digital signal processing (DSP) block 1140 and a DVED1 1145 connected to a first digital MEM microphone, and a second DSP block 1150 and DVED2 1155 connected to a second digital MEM microphone. The design may include support for two standalone analog VED circuits with 3:1 mux inputs as shown. VED's can be independently turned on/off or combined. In addition, the design includes the ability to include VED functionality for digital MEM microphones 1105 as shown. DVED's are independent from the normal digital microphone path (e.g., first DSP 1140 or second DSP 1150). In one implementation, the system 1100 provides support for four digital mics such that there are two digital mics multiplexed on each input interface, as well as one DVED (e.g., DVED1 1145 or DVED2 1155) per interface.

Figure 12:
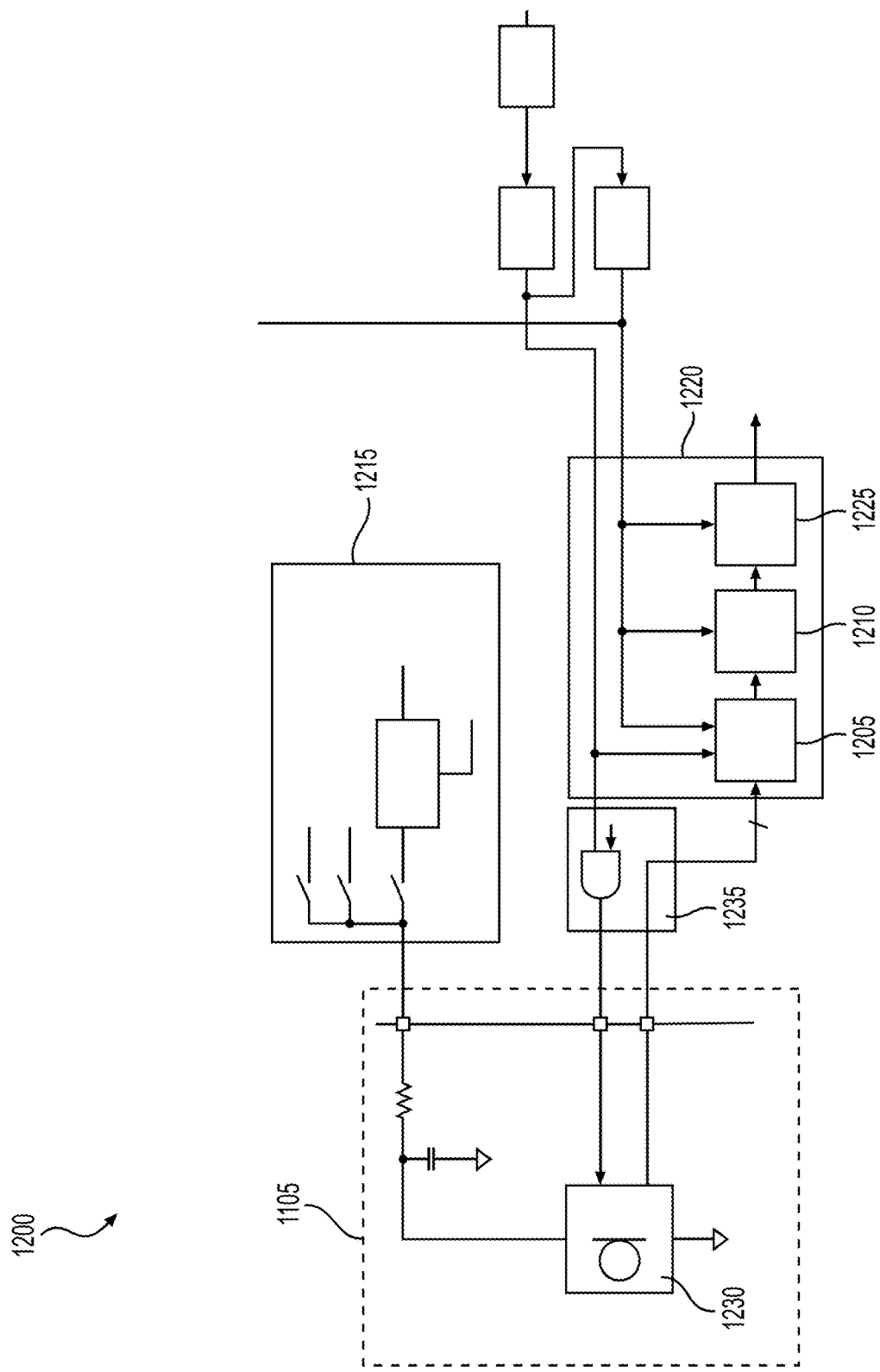
FIG. 12 illustrates an exemplary DVED microphone input according to one or more aspects of the disclosed subject matter.

FIG. 12 is an exemplary DVED microphone input 1105 according to one or more aspects of the disclosed subject matter. Generally, the DVED microphone input 1105 can include a digital MEM microphone 1230. Additionally, the DVED microphone input 1105 can be connected to a microphone bias block 1215 and an AND gate block 1235. The AND gate block 1235 can be connected to a DVED 1220 which can include a cascaded integrator-comb (CIC) decimator filter 1205, a DEVD front end 1210, and a VED algorithm 1225. In one implementation, the DVED microphone input 1105 can be part of a DVED system 1200. Microphone bias (e.g., microphone bias block 1215) can generate a 1.8V digital output for lowest power consumption, for example. The external RC filter can be relaxed compared to an ECM microphone. A programmable clock to the digital MEM microphone can be generated. The clock can be programmable between 512K to 768K. The interface to the digital MEM (e.g., DVED microphone 1105) can be configured to take care of any de-multiplexing and re-clocking.

The cascaded integrator-comb (CIC) decimator filter 1205, the DVED front end 1210, and the VED algorithm 1225 included in the DVED 1220 are further described herein.

Figure 13:
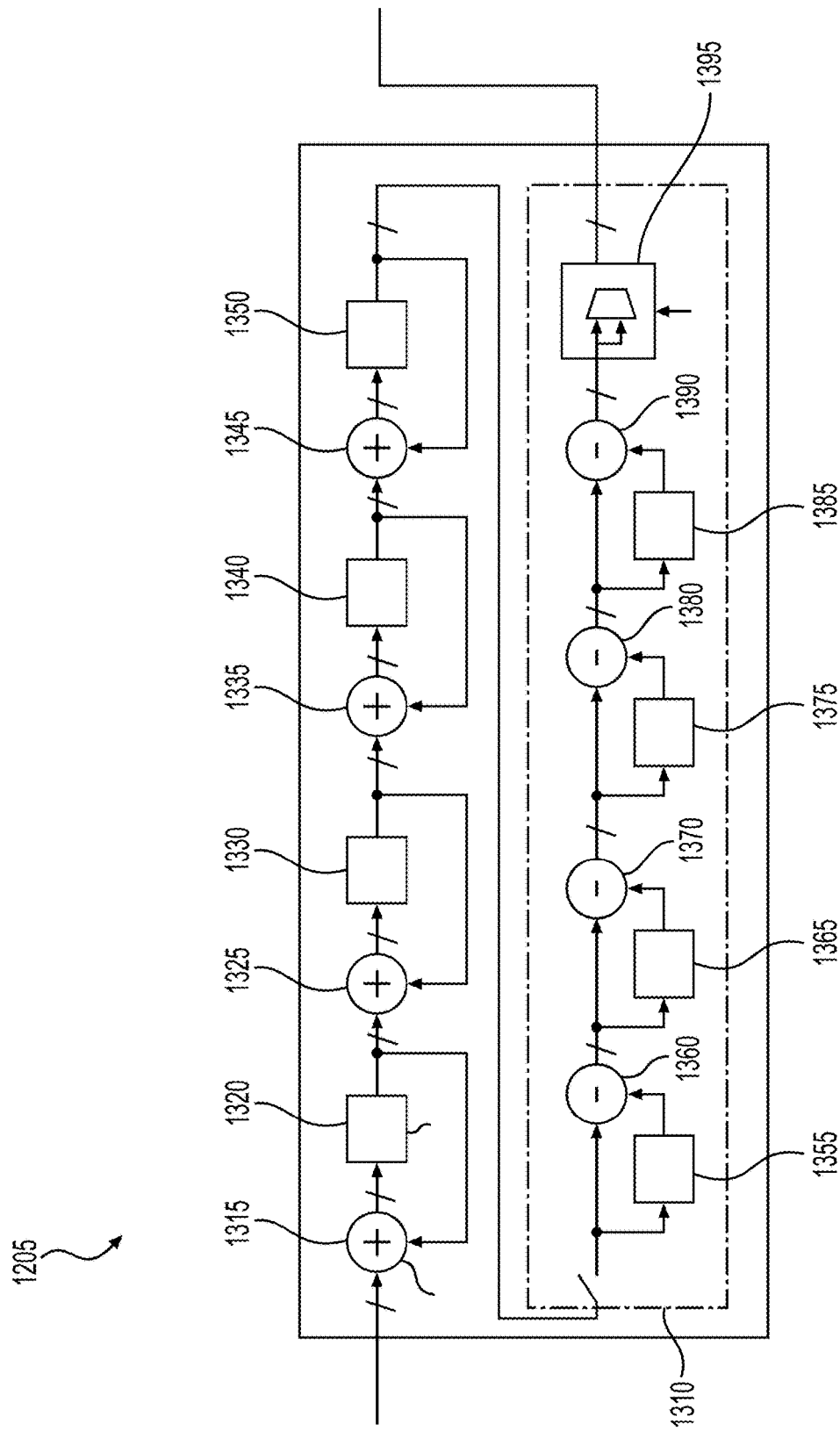
FIG. 13 illustrates an exemplary DVED CIC decimator filter according to one or more aspects of the disclosed subject matter.

FIG. 13 depicts an exemplary DVED cascaded integrator-comb (CIC) decimator filter 1205 according to one or more aspects of the disclosed subject matter. Generally, the decimator filter 1205 includes a first adder 1315 and a first delay 1320, a second adder 1325 and a second delay 1330, a third adder 1335 and a third delay 1340, a fourth adder 1345 and a fourth delay 1350. Additionally, the decimator filter 1205 includes a decimation clock 1310 which includes a fifth delay 1355 and a first subtractor 1360, a sixth delay and a second subtractor 1370, a seventh delay 1375 and a third subtractor 1380, an eighth delay 1385 and a fourth subtractor 1390, and a shifter block 1395. The clock used for the input can be the same as the MEM microphone which should be programmable in the 512-768 KHz range. A jitter for this clock needs to be <<100 ns edge to edge for VED. The jitter can be the deviation from true periodicity of a periodic signal. In one implementation, the decimation clock 1310 is ~32 KHz (+/−5%) and a straight digital divide of the input clock. OSR should be in the 16-24 range. It should be appreciated that a small amount of in-band droop from a straight CIC is acceptable for VED processing. The minimum CIC filter target is a fourth order (4 integrators, decimation, 4 differentiators). This should get greater than 90 dB SNR from quantization noise with a fourth order microphone (e.g., OSR=16). In one implementation, an initial bus width is 21 bits (4*log 2(OSR max)+1), and output can scale to 16 bits using a shifter (e.g., shifter block 1395). It should be appreciated that there could be some DC offset in digital microphones.

Figure 14:
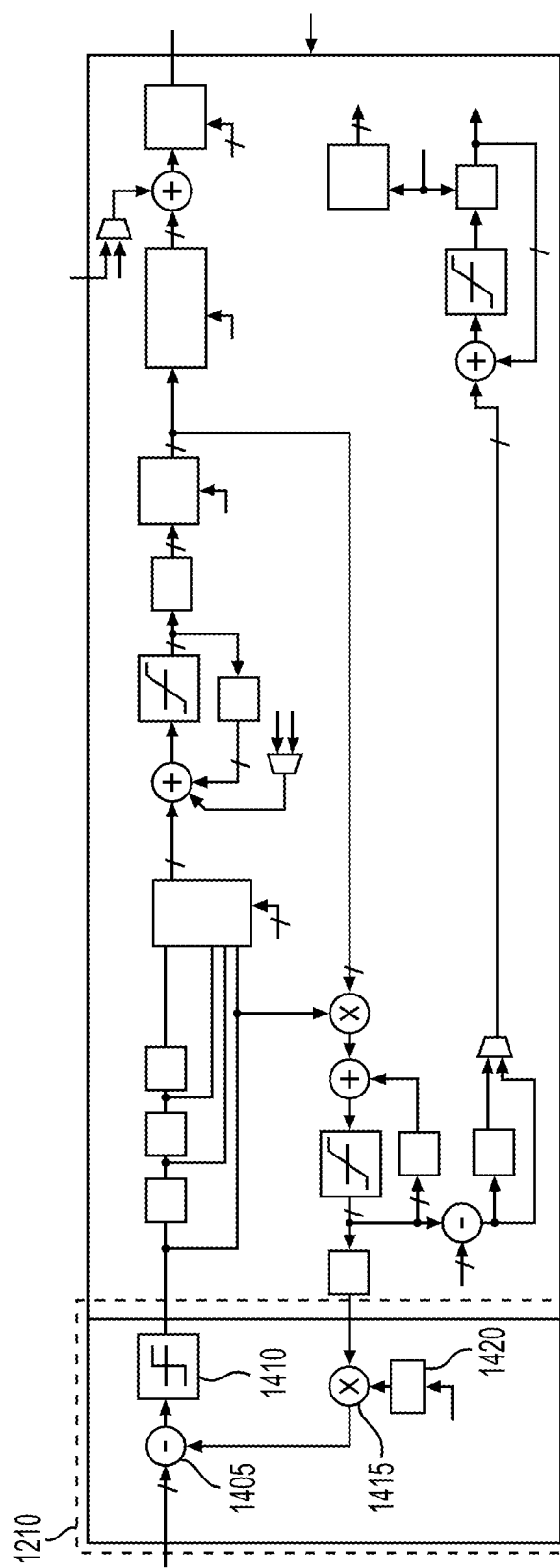
FIG. 14 illustrates an exemplary DVED front end configured for DVED front end processing according to one or more aspects of the disclosed subject matter.

FIG. 14 depicts an exemplary DVED front end 1210 configured for DVED front end processing according to one or more aspects of the disclosed subject matter. Generally, the DVED front end 1210 can include a subtractor 1405, a sign block 1410, multiplier 1415, and a gain select block 1420. In one implementation, the front end logic can emulate the comparator and DAC for AVED processing. For example, input can come from the shifted output of the CIC decimator filter 1205. The 8 bits from the DAC accumulator needs to be multiplied to provide AGC/Gain scaling. This can be a larger range compared to AVED. The DVED front end processing can use a shift and add technique for multiplication. In one implementation, a 20 dB range with 2 dB steps for scaling can be used, and output can be 16 bits to match output from the shifted CIC decimation filter 1205.

Figure 15:
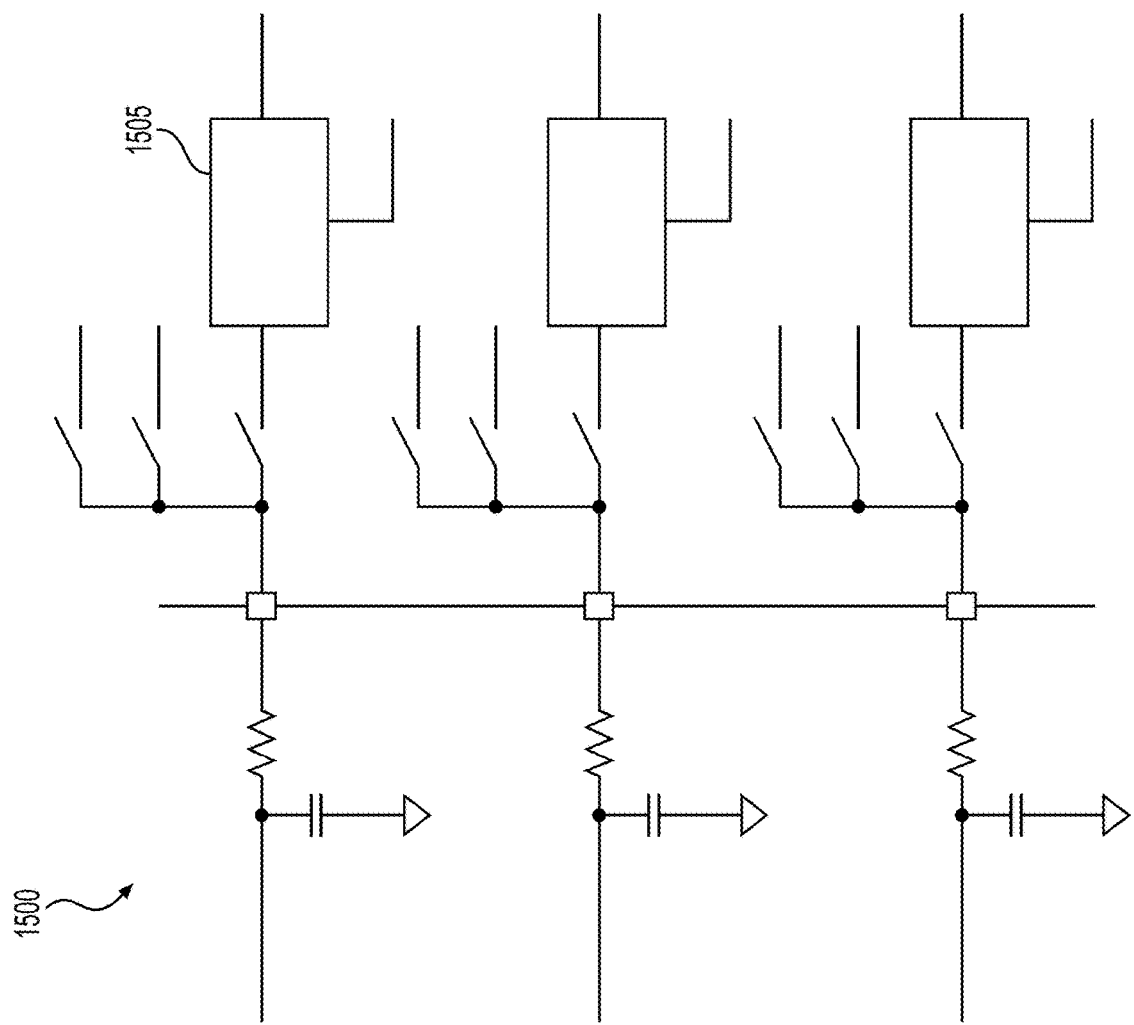
FIG. 15 illustrates exemplary microphone bias architecture according to one or more aspects of the disclosed subject matter.

FIG. 15 depicts an exemplary microphone bias architecture 1500 according to one or more aspects of the disclosed subject matter. In one implementation, the microphone bias architecture 1500 can include three independent microphone bias generators. Additionally, two microphone bias supplies are specified to support up to four digital microphones. Further, 1.6V and 1.8V output modes can be added to a low-dropout regulator (LDO) 1505 (which can represent one or more LDOs), and LDO quiescent current can be reduced as practical. For VED mode, noise at the microphone input pins from the microphone bias supply should be maintained at much less than 8 uV RMS. This corresponds to approximately less than 2 mV RMS at the microphone bias pin with a differential microphone configuration. Additionally, the microphone bias architecture 1500 can include a provision for a GPIO to change Rbias with external FET switches for lower VED microphone bias current.

Figure 16:
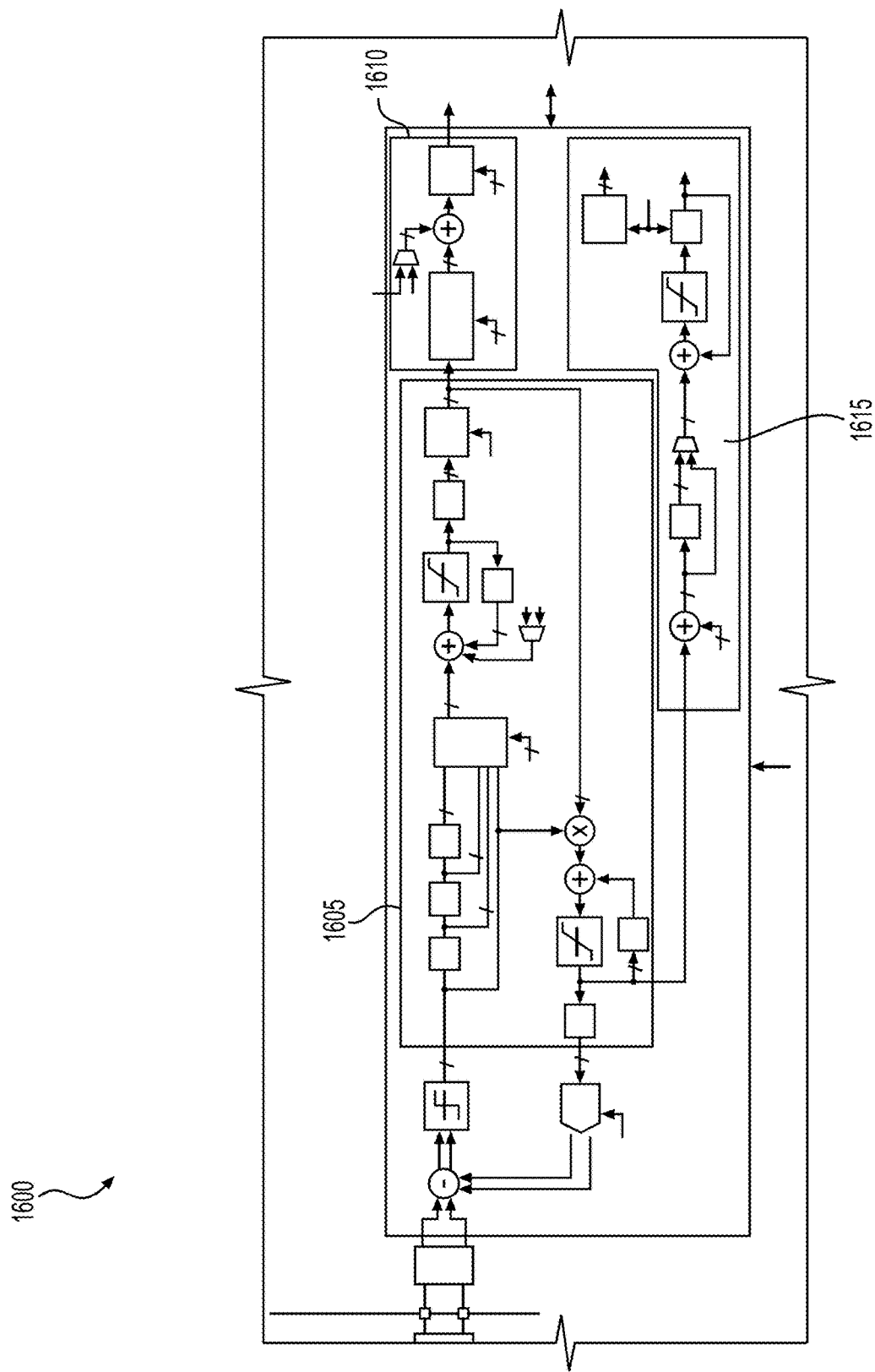
FIG. 16 illustrates an exemplary AVED system according to one or more aspects of the disclosed subject matter.
Figure 17:
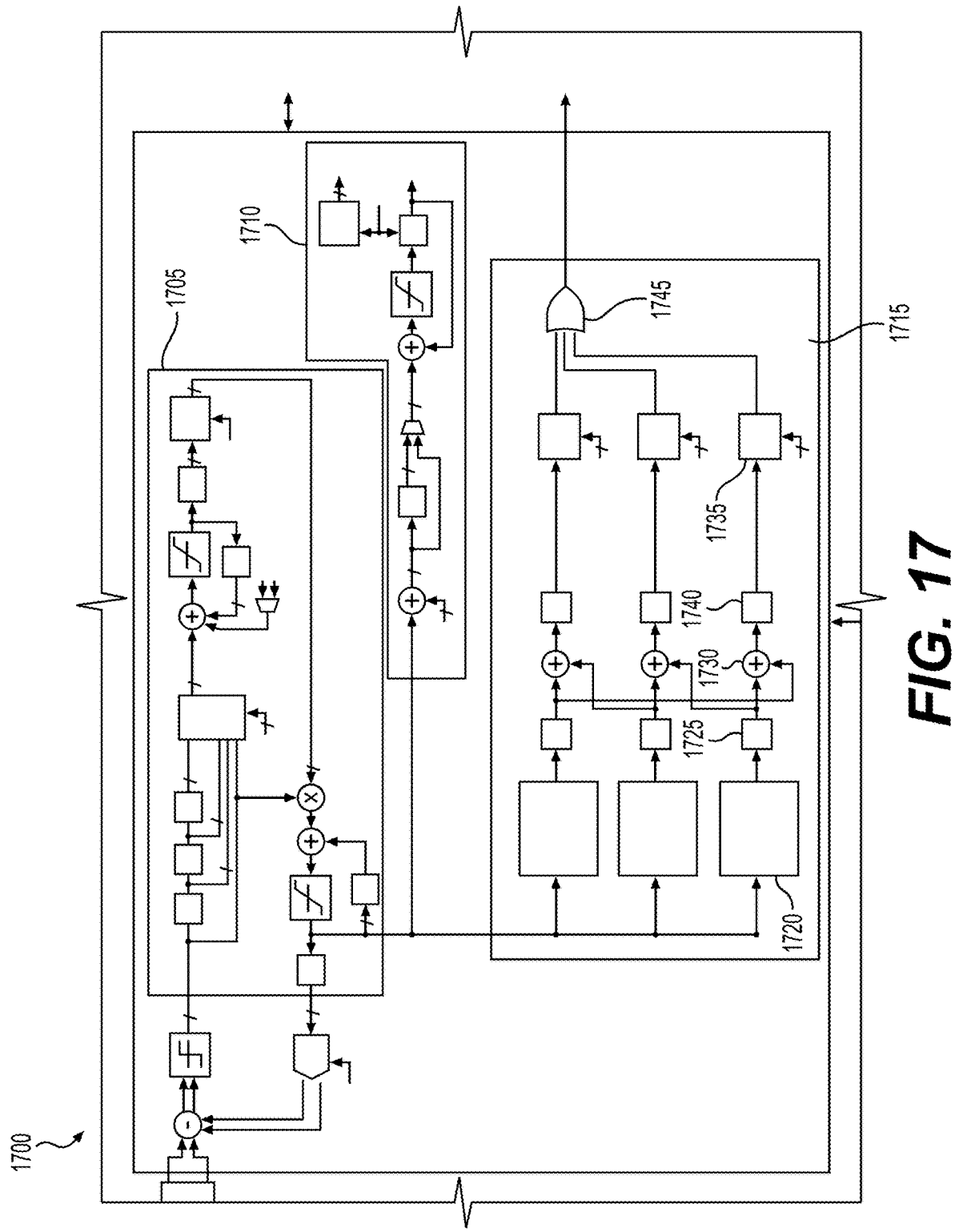
FIG. 17 illustrates an exemplary AVED system according to one or more aspects of the disclosed subject matter.

FIG. 16, FIG. 17, Tables 2 and 3, and corresponding descriptions outline differences between a first VED algorithm (which can also be referred to as VED1) and a second VED algorithm (which can also be referred to as VED2). In one or more aspects of the disclosed subject matter, an enhanced VED approach can be used to increase performance and add more design margin in the system. More specifically, the VED2 algorithm can get above 96%-97% performance at the expense of a modest increase in digital gate count as further described herein.

FIG. 16 depicts an exemplary AVED (which can also be referred to as AVED1 for comparison purposes) system 1600 according to one or more aspects of the disclosed subject matter. Generally, the AVED system 1600 can include an FSM 1605, a post filter 1610, and AGC support 1615 with the components for each having already been described herein. More specifically, AVED1 can include a slope delta ADC converter with post filtering of the loop gain, which can be an improvement over a simple energy detector because the slope filter attenuates low amplitude and high frequency noise.

FIG. 17 depicts an exemplary AVED system 1700 (which may be referred to as AVED2), which is another option compared to AVED1 according to one or more aspects of the disclosed subject matter. Generally, the AVED system 1700 can include an FSM 1705, a post filter 1715, and AGC support 1710. The FSM 1705 and the AGC support 1710 can be the same as the FSM 1605 and AGC support 1615, respectively. However, the post filter 1715 can include a biquadratic band pass filter 1720 representing one or more biquadratic band pass filters, an absolute value function blocks 1725 representing one or more absolute value function blocks positioned between each biquadratic band pass filter 1720 and an adder 1730 representing one or more adders (e.g., for each absolute value function block 1725). Additionally, an absolute value function block 1740 can be positioned between each adder 1730 and a threshold block 1735 representing one or more threshold blocks 1735 (e.g., for each absolute value function block 1740) such that each threshold block 1735 converges at an OR gate 1745. More specifically, AVED2 can include a slope delta ADC converter with a sub band difference post filter. The AVED2 architecture can be an improvement over the AVED1 (e.g., from FIG. 16) because the sub band difference post filter better targets speech characteristics. Further, the AVED system 1700 has additional flexibility to tailor performance for a specific wake word.

Table 2 is a summary performance comparison of exemplary AVED algorithms.

TABLE 2

| AVED algorithm | Probability of detection within 40% of the first phoneme (near-field) % | Probability of detection within 60% of the first phoneme (near-field), % | Probability of detection within 60% of the first phoneme (far-field), % | Probability of detection within 40% of the first phoneme (far-field), % | Probability of a false alarm (near field), % | Probability of a false alarm (far field), % |
|---|---|---|---|---|---|---|
| Dolphin - Ultra low power voice detector for audio streaming (25-40 ua) 7% NDV at 85% of VDV 40% (MIWOK-C R1.0 benchmark) 93.6% within 60% of the first phoneme | 85 assuming combined far field and near field | 93.6 assuming combined far field and near field | 93.6 assuming combined far field and near field | 85 assuming combined far field and near field | 7% assuming combined far field and near field | 7% assuming combined far field and near field |
| AVED1 - baseline (Feb. 12, 2017) Atten = 1/100, cons_sel = 0, thresh = 1.75, LSB = 75 uV, 10 uV rms noise at comparator input, input BPF, "LUT" output used for the post filter input, post filter is 1/8 * [1 × 8], LUT = 1, 2, 5, 12, 32, 64, 128 | 89.06 (10 uV) | 95.11 (10 uV) | 94.29 (10 uV) | 87.53 (10 uV) | 7.25 | 5.03 |
| AVED2 - proposal - ideal latency matched BPF's (Feb. 12, 2017) Atten = 1/100, cons_sel = 0, thresh = 2.25 2.5, 2.25, LSB = 75 uV, 10 uV rms noise at comparator input, input BPF, 3 band (300-800, 1000-3000, 3300-10k) | 92.75 (10 uV) | 97.68 (10 uV) | 97.22 (10 uV) | 91.43 (10 uV) | 8.11 | 5.69 |
| AVED2 - proposal - Biquad BPF's (Feb. 23, 2017) Atten = 1/100, cons_sel = 0, thresh = 2.15, 2.25, 2.35, LSB = 75 uV, 10 uV rms noise at comparator input, input BPF, 3 band (300-800, 1000-3000, 3300-10k) | 91.48 (10 uV) | 97.12 (10 uV) | 96.60 (10 uV) | 90.10 (10 uV) | 7.53 | 4.94 |
| AVED2 - proposal - Biquad BPF's (Feb. 27, 2017) Atten = 1/100, cons_sel = 0, thresh = 2.15, 2.25, 2.35, LSB = 86 uV, 15 uV rms noise at comparator input, input BPF, 3 band (300-800, | 91.04 (15 uV) | 96.97 (15 uV) | 96.48 (15 uV) | 89.74 (15 uV) | 7.47 | 5.0 |

TABLE 2-continued

| AVED algorithm | Probability of detection within 40% of the first phoneme (near-field) % | Probability of detection within 60% of the first phoneme (near-field), % | Probability of detection within 60% of the first phoneme (far-field), % | Probability of detection within 40% of the first phoneme (far-field), % | Probability of a false alarm (near field), % | Probability of a false alarm (far field), % |
|---|---|---|---|---|---|---|
| 1000-3000, 3300-10k), removed post FIR filter [11] * ½ | | | | | | |

As shown in Table 2, the AVED system 1700 (AVED2) has approximately a 2.5 percent improvement over the AVED system 1600 (AVED1).

Table 3 is a summary of a comparison of the AVED algorithms.

TABLE 3

| Category | AVED1 | AVED2 | Comments |
|---|---|---|---|
| Power Consumption (typ) | 15 uA at 1.8 V | 20 uA @1.8 V | 100 uV (worst case) comparator referred input noise. |
| Power Consumption (typ) | 42 uA at 1.8 V | 47 uA @1.8 V | 15 uV (worst case) comparator referred input noise |
| Digital Area | ~1500 um^2 per VED | ~4000 um^2 per VED | FSM_Accum = 800 um^2 |
| Schedule | Apr. 24, 2017 Final frame view<br>Jul. 10, 2017 Final GDS | Apr. 24, 2017 Final frame view<br>Jul. 10, 2017 Final GDS | Final DVED2 RTL Apr. 17, 2017 |
| Clocking | Single 32 KHz clock | Dual: 32 KHz clock and a >32 KHz * 20 clock | Higher clock for the post filter |

AVED2 is approximately 2-2.5% better performance with negligible impact to die area and power. No impact to schedule.

Figure 18:
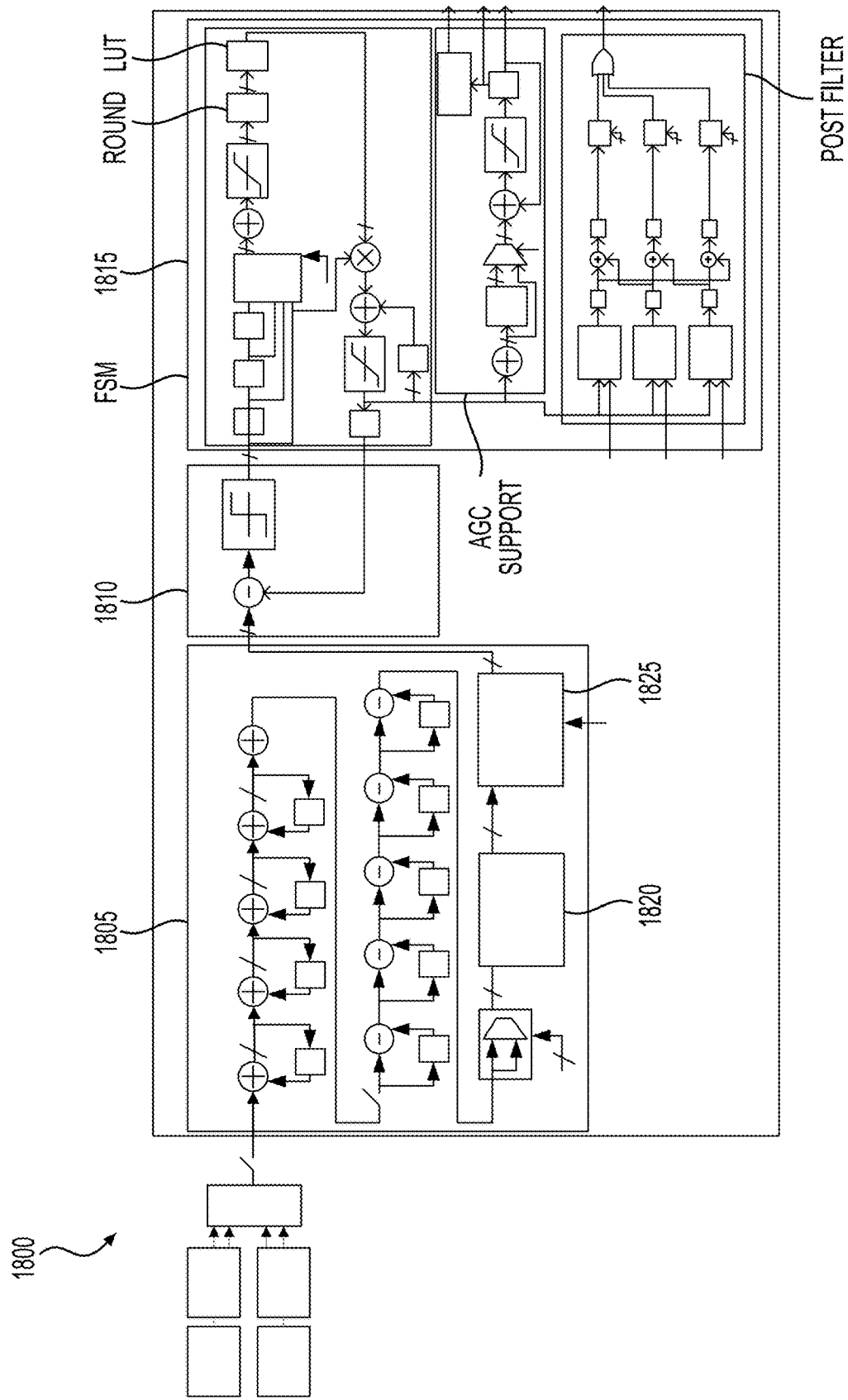
FIG. 18 illustrates an exemplary DVED system according to one or more aspects of the disclosed subject matter.

FIG. 18 depicts an exemplary overview a DVED system 1800 (which may also be referred to as DVED2 when compared to DVED system 1200) according to one or more aspects of the disclosed subject matter. The DVED system 1800 includes a CIC decimator filter 1805, a DVED front end 1805 (e.g., DVED front end 1205), and structure 1815 corresponding to a VED algorithm. In addition to the CIC decimator filter components of the CIC decimator 1205 in FIG. 12, the CIC decimator filter 1805 can include a biquadratic high band pass filter 1820 and a biquadratic low band pass filter 1825. The structure 1815 can correspond to AVED system 1700. In one implementation, the CIC decimator filter 1805 is configured for digital decimation and noise filtering. In one implementation, the DVED front end 1805 is configured to replace the ADC and DAC.

Table 4 is a table of exemplary analog DAC and comparator simulation results. The analog for 2 meter audio processing (15 uV RMS) may include low input referred noise such that comparator noise may be dominated by preamp input pair (thermal noise). For example, noise improvement can be from 100 uV to 15 uV corresponding to an additional 25 uA. Control bits can be added to adjust the noise level.

TABLE 4

| Noise estimate (Vrms) | Comparator current. (preamp tail current) | Total current (worst) |
|---|---|---|
| 100 uV (wor), 82 uV (typ) | 0.6 uA | 15 uA |
| 8 uV | 94 uA | 110 uA |
| 15 uV | 26.7 uA | 42 uA |
| 20 uV | 15 uA | 30 uA |
| 30 uV | 6.7 uA | 22 uA |
| 40 uV | 3.75 uA | 19 uA |

Finite state machine accumulation with the post processing block can correspond to an Area of ~4000 um^2 and Power of ~5 uW at 0.9V.

Digital VED2 can correspond to CIC/biquad filter/digital front end comparator and can be synthesized using Broadcom's Easyflow, for example. The power estimate can be done using the VCD generated from a gate netlist. The Area can be ~5600 um^2 and the Power ~10 uW at 0.9V.

Digital finite-state machine accumulation can correspond to Area ~800 um^2 and Power ~1 uW at 0.9V, which may be too low for tools.

FIGS. 19-22 describe changes needed to incorporating a capture buffer improvement for VED.

Figure 19:
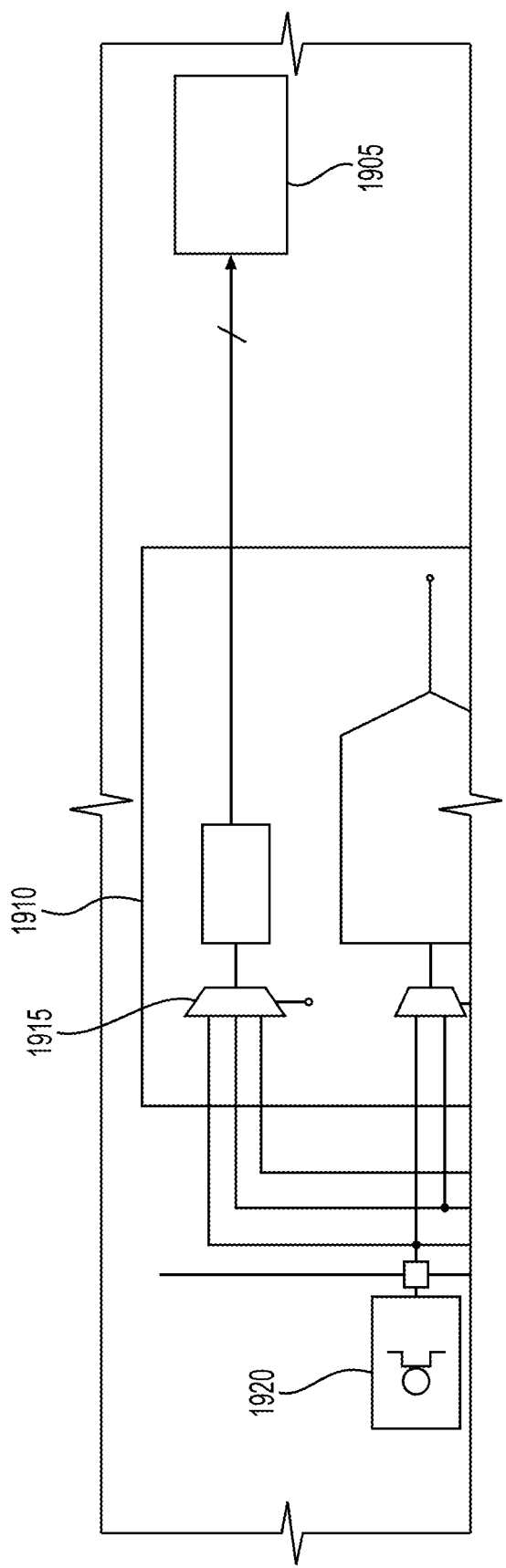
FIG. 19 illustrates an exemplary capture buffer according to one or more aspects of the disclosed subject matter.

FIG. 19 illustrates an exemplary capture buffer 1905 in an AVED system according to one or more aspects of the disclosed subject matter. Generally, the capture buffer is connected to an AVED 1910, which is connected to a multiplexer 1915, which is connected to a mic 1920. More specifically, the capture buffer 1905 is a buffer which captures audio ADC samples in parallel with the VED circuit operation. The purpose for this buffer is to allow the CM0 to go back in time to get more of the lost Phoneme when the wake-up circuit triggers on desired speech. This ensures that even if the wake-up trigger is late to fire, that high wake word detection can still occur. This takes some of the pressure off getting detection early which can reduce false alarm rates. Also some Phonemes are hard to detect early. This logic also allows the CM0 to more quickly determine whether the wake-up was a false alarm or not since the CM0 has instantaneous access to past relevant audio samples. To support this, the VED circuitry can be modified to bring out the audio samples. The SoC can decide how much memory to add and how to connect the buffer to the audio channels.

Figure 20A:
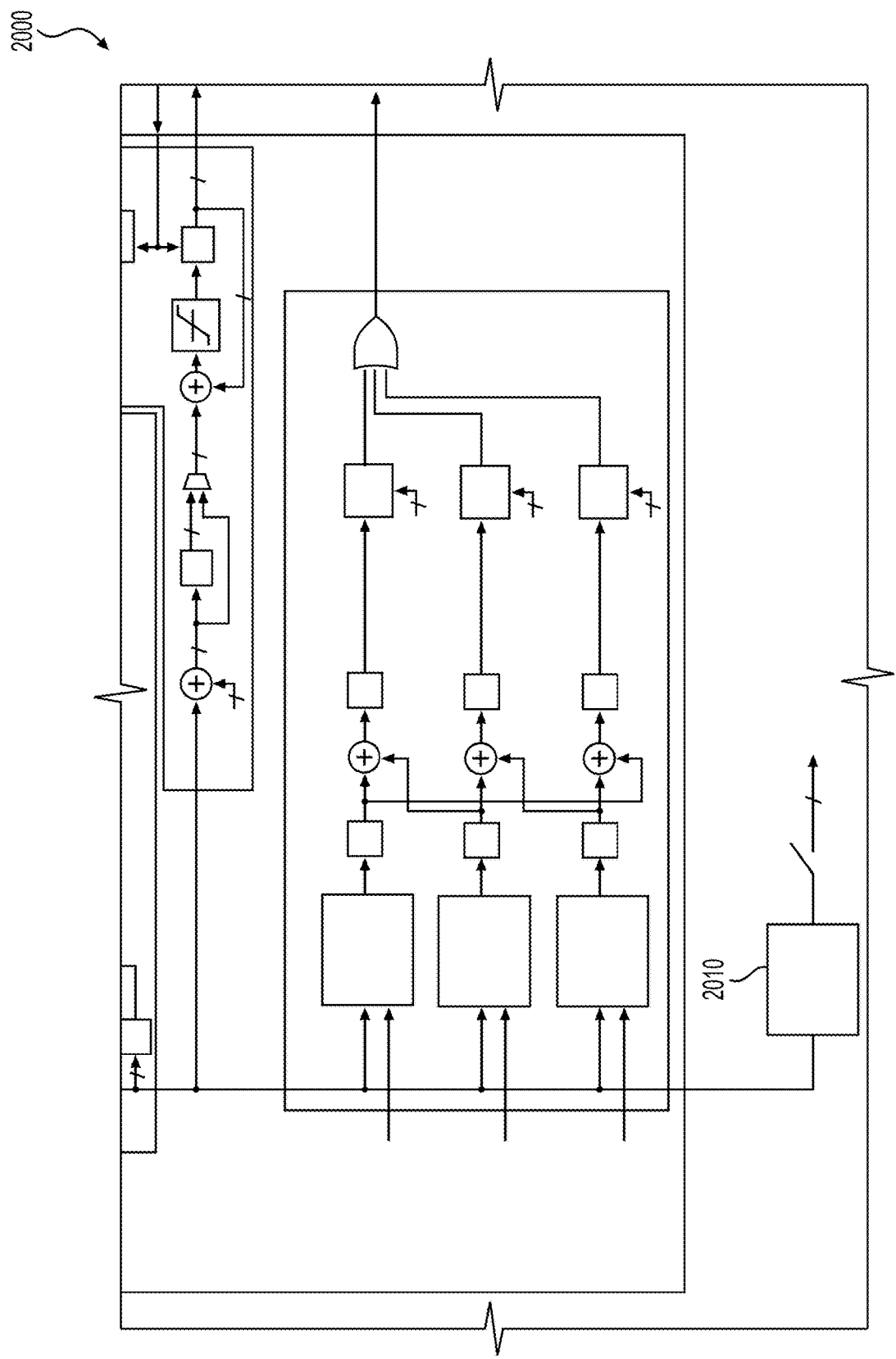
FIG. 20A is an exemplary AVED system according to one or more aspects of the disclosed subject matter.

FIG. 20A is an exemplary AVED system 2000 according to one or more aspects of the disclosed subject matter. Generally, the AVED system 2000 includes a biquadratic band pass filter block 2010 connecting a capture buffer to the AVED architecture (e.g., post filter 1715). More specifically, the audio can be estimated using an 8 bit DAC integrator output. This signal can be noisy and sampled at 32 KHz (32-64 KHz), for example. A low pass filter may be added to the signal and then subsample to output either 8 or 16 KHz. The low pass filter can be a simple sliding window FIR (2, 4, 8 samples like in AVED1) or a BQF with parameters set to a low pass function. Still, signal may be noisy. Increasing the clock to 64 KHz can help.

Figure 20B:
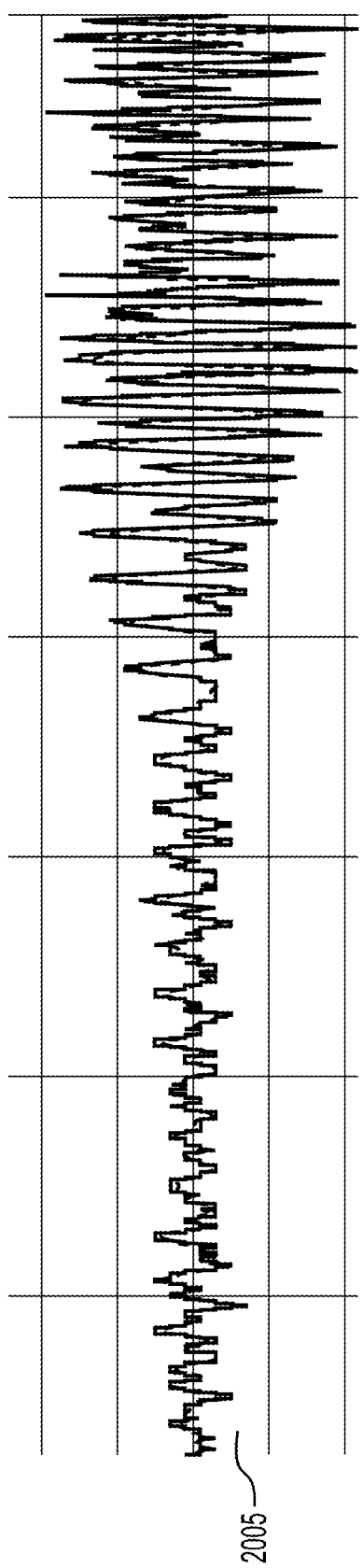
FIG. 20B is a microphone input and DAC accumulation output according to one or more exemplary aspects of the disclosed subject matter.

FIG. 20B is a microphone input and DAC accumulation output 2005 according to one or more aspects of the disclosed subject matter. In one implementation, the FIR=[1 1 1 1]*0.25.

Figure 21:
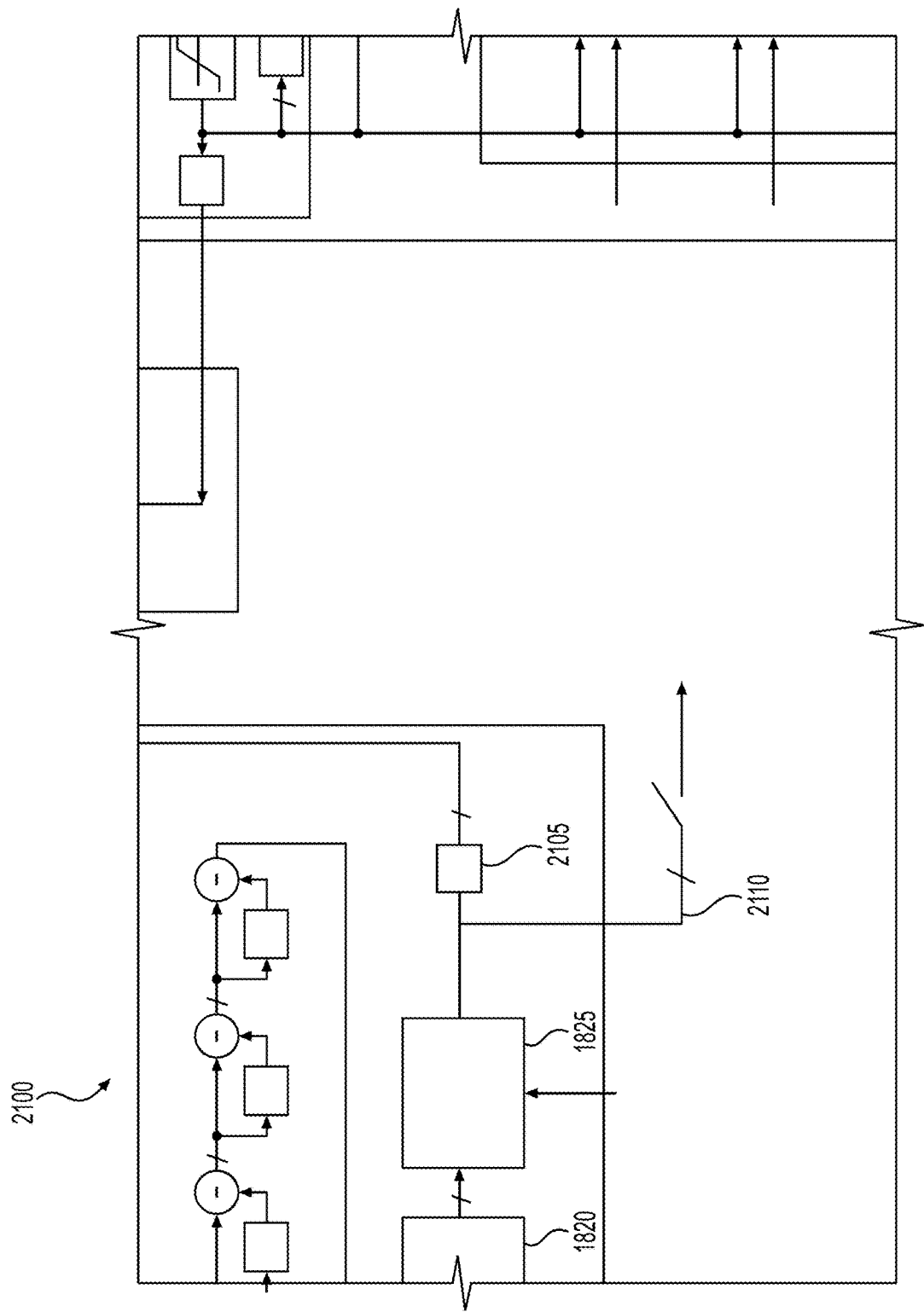
FIG. 21 is an exemplary portion of a DVED system according to one or more aspects of the disclosed subject matter.

FIG. 21 is an exemplary portion of a DVED system 2100 according to one or more aspects of the disclosed subject matter. In one implementation, the portion of the DVED system 2100 reflects changes for incorporating the capture buffer (e.g., capture buffer 1905). The audio can be estimated using the output 2110 of the decimator BQF's (e.g., biquadratic band pass filters 1820, 1825). This signal is very clean and sampled at 32 KHz (32-64 KHz), for example, and the BQF output needs to be tapped where the signal has 16 bits of resolution. This can be before any floor/rnd function block 2105 is used for further truncation to the VED2 algorithm. The signal can be sub sampled at either 8 or 16 KHz. This can be done outside the DVED block. Additionally, output pins can be allocated for the audio bus.

Figure 22:
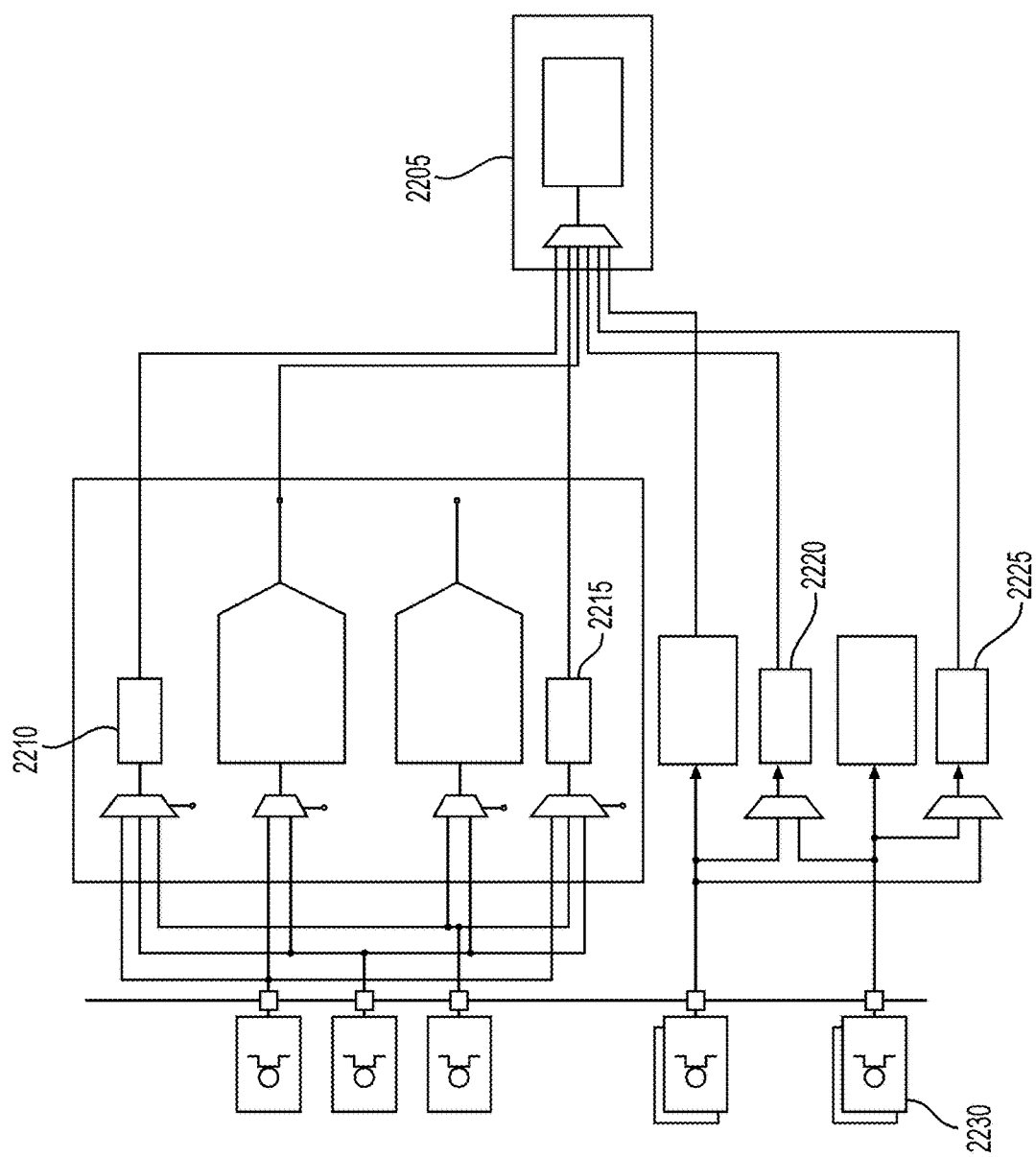
FIG. 22 illustrates an exemplary capture buffer according to one or more aspects of the disclosed subject matter.

FIG. 22 depicts an exemplary capture buffer 2205 according to one or more aspects of the disclosed subject matter. Generally, the capture buffer 2205 can be added to architecture similar to the DVED system 1100 in FIG. 11, however, the architecture in FIG. 22 includes a first and second AVED 2210, 2215 rather than a VED1 and VED2, and the architecture in FIG. 22 includes a first and second DVED 2220, 2225 rather than a DVED1 and DVED2. Additionally, the architecture in FIG. 22 can include a single multiplexed buffer between the one or more digital MEM mics 2230. The die area impact can be high. To minimize die area, 8 KHz sample rates can be considered. Additionally, 10 or 12 bit wide samples can be considered. The high performance ADC can be multiplexed to the capture buffer input. The same algorithm which selects the best microphone can also be used to select where to place the capture buffer. In one implementation, a FIFO structure but a circular buffer in SRAM using a DMA can be used with a 20 ms minimum and a 50 ms buffer length.

FIGS. 23-28 illustrate lowering total microphone bias power consumption when VED operates. In one or more aspects of the disclosed subject matter, lowering total microphone bias current may be accomplished as further described herein. The legacy codec/AFE design has provisions within the internal microphone bias generator to lower total microphone bias power consumption when VED operates. However, there are changes to consider that can help lower power consumption further if ECM microphones are used. Several microphone bias circuit design solutions may fall into two categories:

1) Enhance the existing internal microphone bias circuit to lower the total power assuming an ECM is used, which can be done via increasing Rbias, reducing Vs, or both during VED.

2) Keep the internal microphone bias circuit as is, which may be for MEM microphones or ECM without additional power savings when VED is running. Can remove the internal microphone bias LDO mode to save die area.

Figure 23:
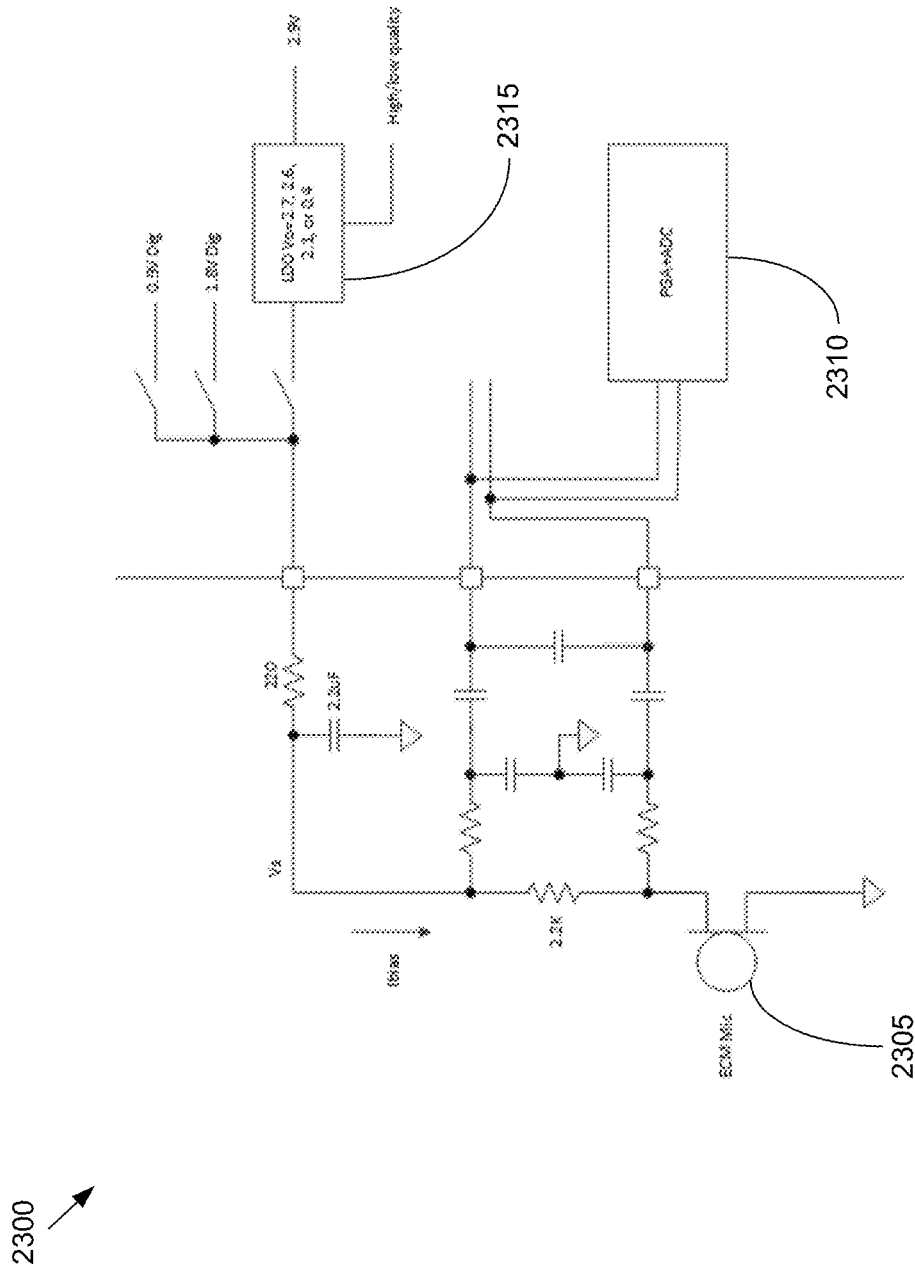
FIG. 23 illustrates an exemplary legacy design according to one or more aspects of the disclosed subject matter.

FIG. 23 illustrates an exemplary legacy design 2300 according to one or more aspects of the disclosed subject matter. The legacy design 2300 includes an ECM microphone 2305, an LDO 2310, and a PGA+ADC 2315. Microphone bias in the legacy design can generate programmable output voltages. High quality mode (low noise) LDO 2315 can add ~200 ua current from a 2.9V rail. Low quality mode (higher noise) LDO 2315 can add ~50 ua current from a 2.9V rail. Digital supplies can add ~0 ua. MEM microphones can use 1.8V digital supply for lowest power during VED mode. If noise is too high, the low quality LDO mode at 2.1V can be used. ECM microphones 2305 can use 1.8V digital supply for lowest power during VED mode. If noise is too high, low quality LDO mode at 2.1V can be used. This will reduce internal microphone bias current but won't reduce the external microphone bias current beyond a predetermined threshold.

Figure 24:
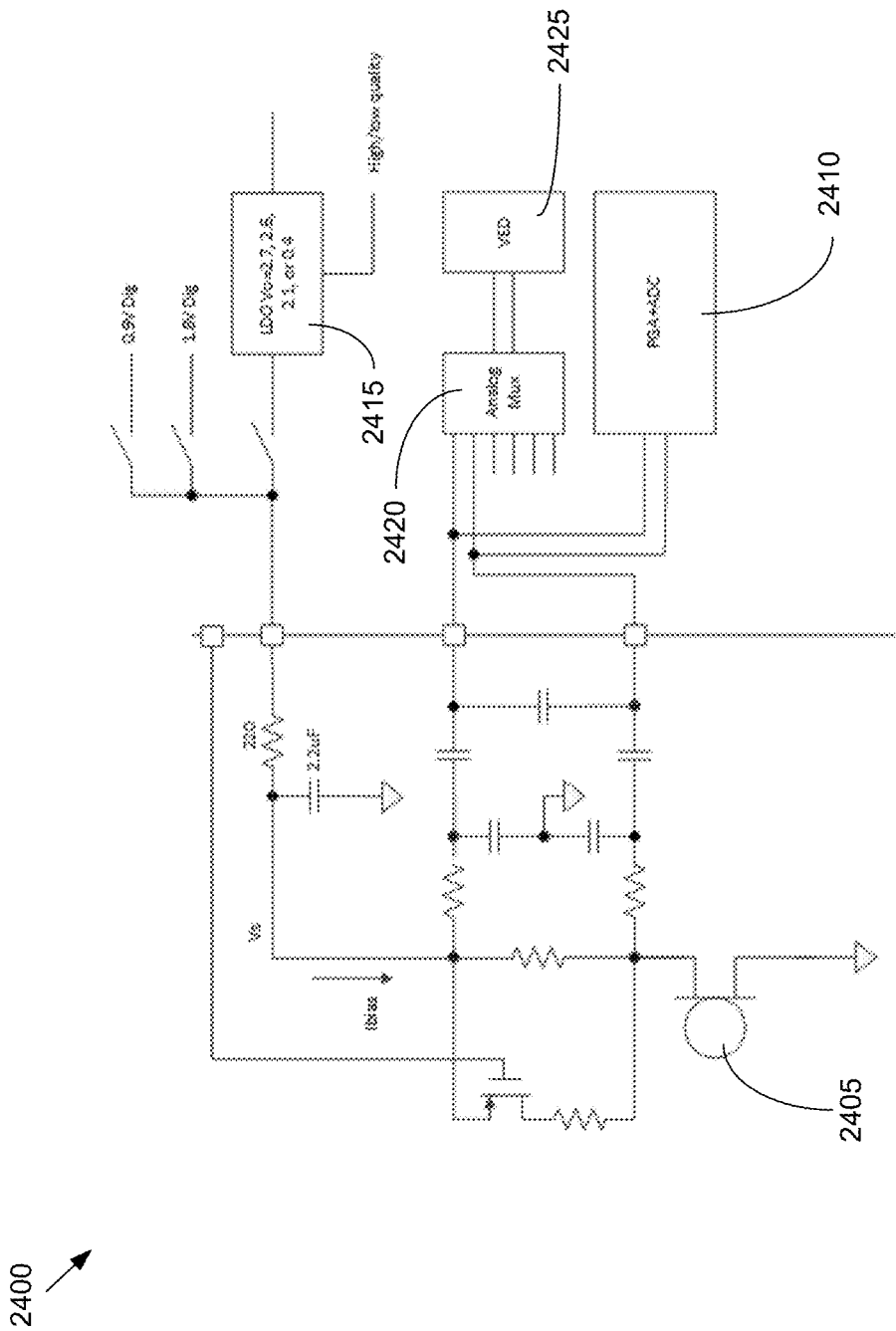
FIG. 24 illustrates a first design according to one or more exemplary aspects of the disclosed subject matter.

FIG. 24 illustrates a first exemplary design 2400 according to one or more aspects of the disclosed subject matter. Generally, the first design 2400 can include an ECM microphone 2405, a PGA+ADC 2410, an LDO 2415, an analog multiplexer 2420, an a VED 2425. In one implementation, the first design 2400 can be for ECM only and adds the ability to switch an external FET to change the external microphone bias current (adjust Rbias). This can be used in conjunction with optional lowering of internal microphone bias output voltage (Vs). Additionally, a pin may be used for digital control (e.g., CM0). Further, the first design 2400 needs to ensure noise or non-linearity from the added FET will not impact VED performance, as well as checking transient when switching modes. An advantage of the first design 2400 is no AMS change and compensation for lower microphone gain when Vs is lowered.

Figure 25:
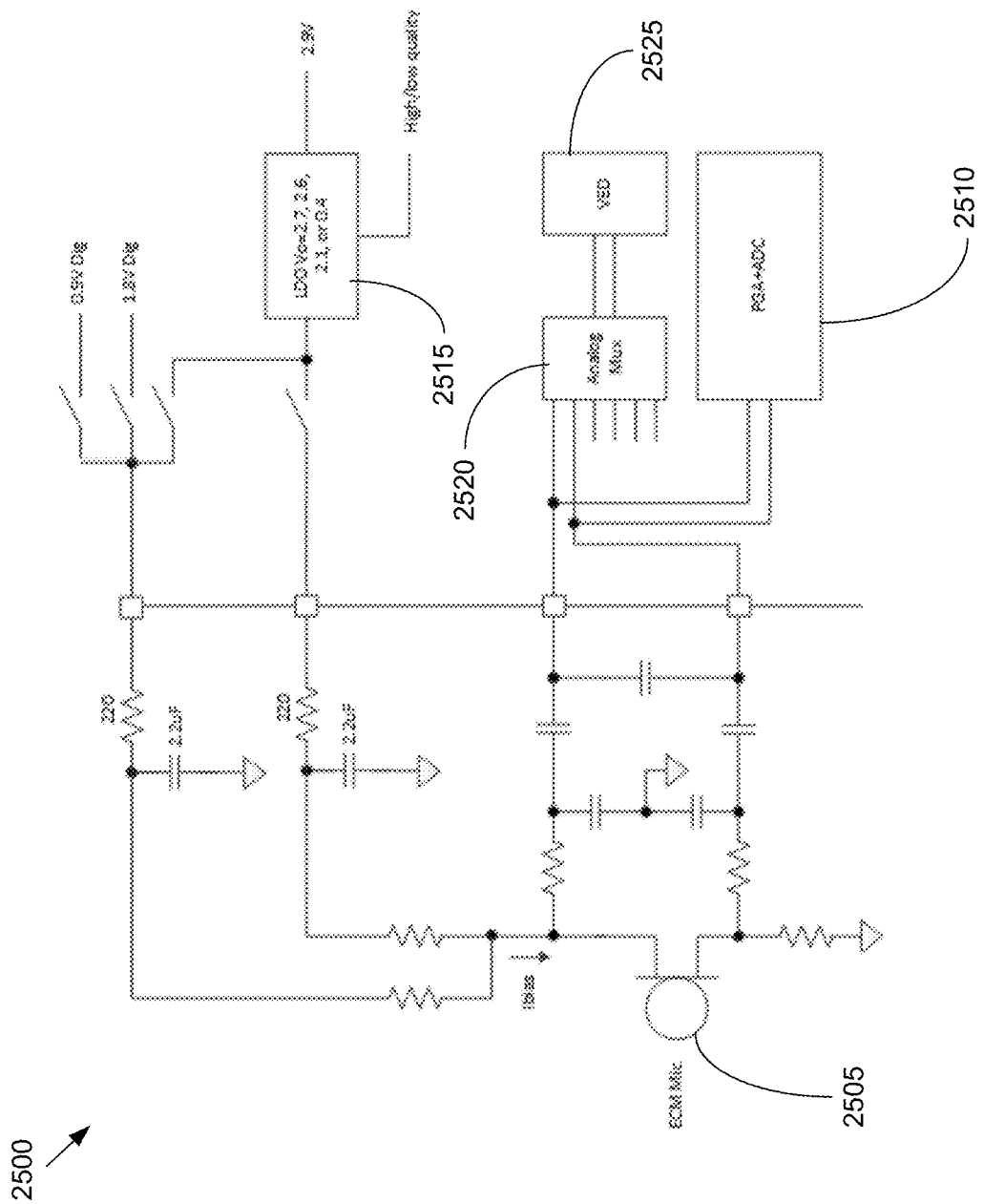
FIG. 25 illustrates a second design according to one or more exemplary aspects of the disclosed subject matter.

FIG. 25 illustrates a second exemplary design 2500 according to one or more aspects of the disclosed subject matter. The second design 2500 can include an ECM 2505, a PGA+ADC 2510, an LDO 2515, an analog multiplexer 2520, and a VED 2525. In one implementation, the second design 2500 can be for ECM only and add the ability to switch in extra bias current for normal bias mode (adjust Rbias). A pin and external RC filter and an extra switch on die may be used. The second design 2500 may need to check that when the LDO switch is off, the RC on the microphone (e.g., ECM 2505) drain does not hurt VED performance/ power appreciably and stability. Additionally, transient can be checked when switching modes.

Figure 26:
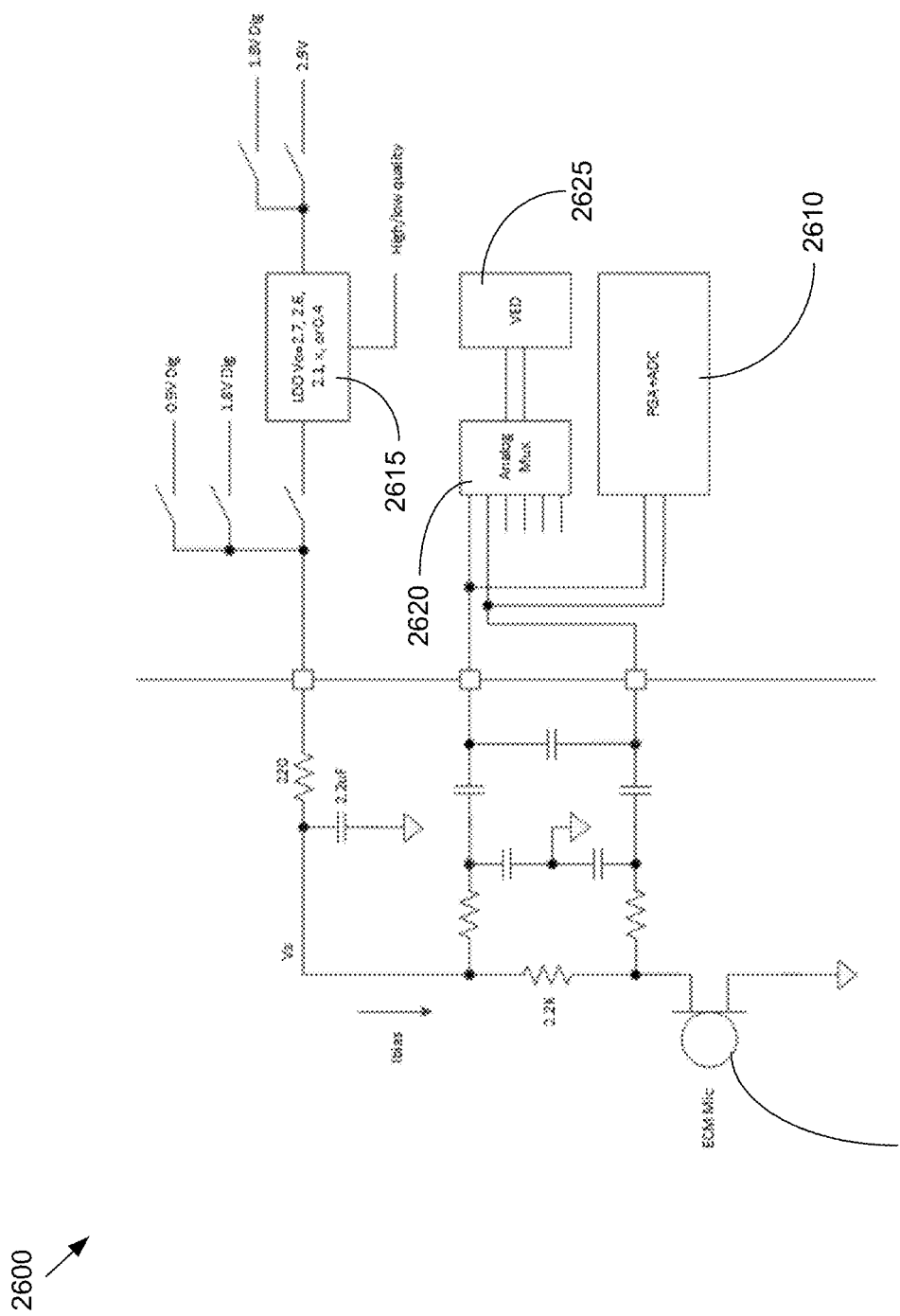
FIG. 26 illustrates a third design according to one or more exemplary aspects of the disclosed subject matter.

FIG. 26 illustrates a third exemplary design 2600 according to one or more aspects of the disclosed subject matter.

The third design 2600 can include an ECM 2605, a PGA+ ADC 2610, an LDO 2615, an analog multiplexer 2620, and a VED 2625. In one implementation, the third design can be for ECM only and keep the microphone bias circuit as is (e.g., legacy design plus the analog multiplexer and VED) but incorporate changes to the LDO as follows:

1) Add 1-1.3V lower voltage output option. Additionally, it is possible add 1.8V option for seamless switching between LDO and digital.

2) Allow the LDO input to use a 1.8V digital supply for the 1-1.3V option.

This will allow Vs to be lowered during VED mode to a voltage ECM's (e.g., ECM 2605) can use which can reduce both the external microphone current and the microphone gain. This may also help eliminate 2.9V rail leakage current. It should be appreciated that 0.9V digital is on the low side and may be too noisy. In the third design 2600, the amount of power savings and LDO loop stability may need to be checked, as well as the transient when switching modes.

Figure 27:
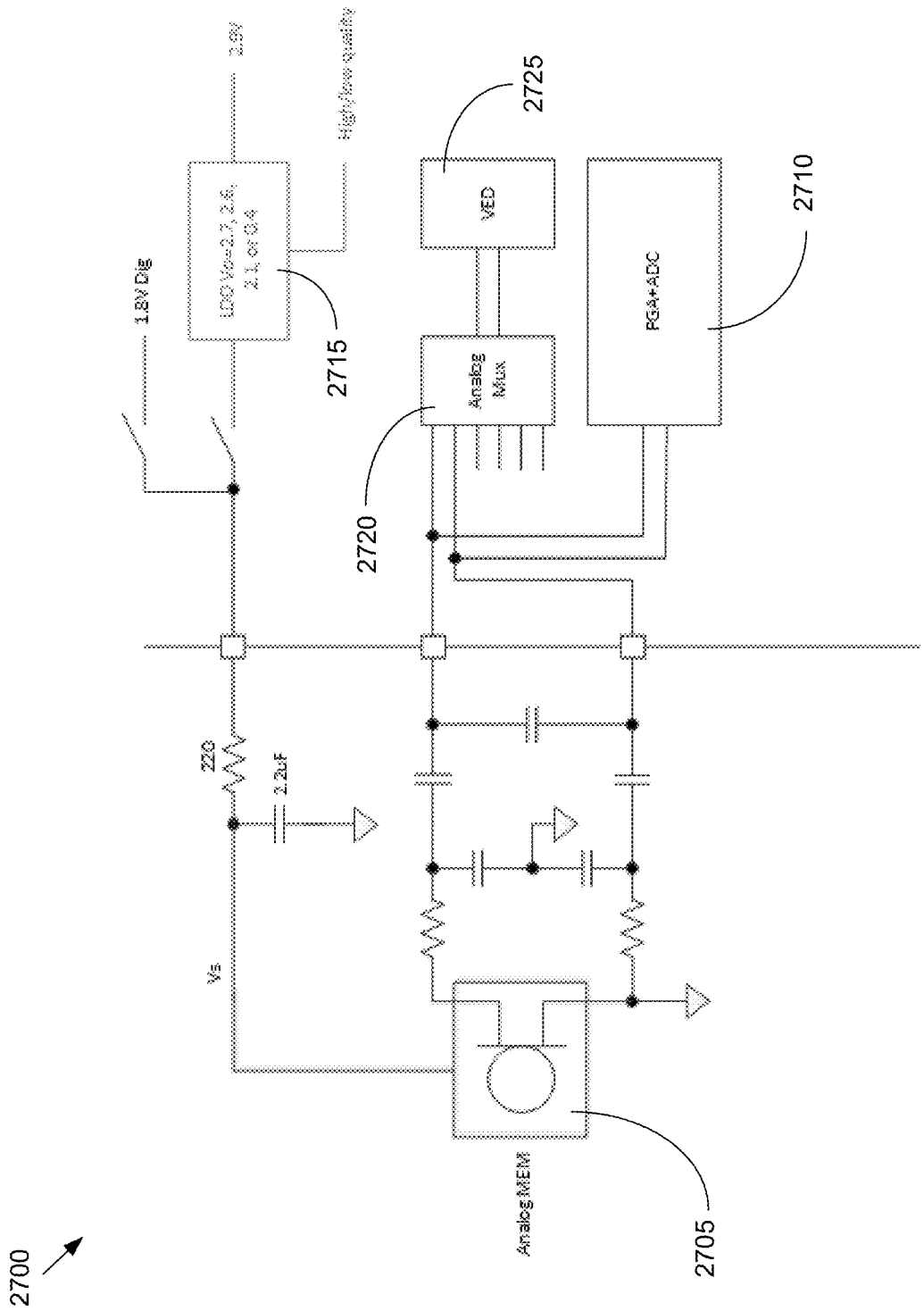
FIG. 27 illustrates a fourth design according to one or more exemplary aspects of the disclosed subject matter.

FIG. 27 illustrates a fourth exemplary design 2700 according to one or more aspects of the disclosed subject matter. The fourth design 2700 can include an analog MEM microphone 2705, a PGA+ADC 2710, an LDO 2715, an analog multiplexer 2720, and a VED 2725. In one implementation, the fourth design 2700 can use MEM microphones (e.g., analog MEM microphone 2705). Either analog or digital MEM microphones can use a somewhat noisy 1.8V supply. The current consumption for an analog MEM can be in the 60-200 uA range depending on performance and vendor. The fourth design 2700 can ensure noise on the supply is okay which may be an issue if the LDO is removed for die area savings. An advantage of the fourth design 2700 is that there should not be any transients between VED mode and normal mode due to changing bias currents.

Though the above descriptions have been organized as four exemplary designs for ease of understanding, one of ordinary skill will recognize that elements of each of the four exemplary designs are combinable with elements of the other of the four exemplary designs without limitation. Other designs are also possible without departing from the scope of the present disclosure.

The current legacy microphone bias design may assist in reducing some current during VED mode. The fourth design may be the simplest solution which can focus on analog and digital MEM microphones. Potential advantages include analog MEM microphones being already low power at full performance (60-200 uA). ECM normal bias current for full performance is usually in the 300-500 ua range. An ECM with reduced performance for VED can get down to using 50-100 ua of bias current when Vs is lowered and/or Rbias is increased. This option may allow elimination of 2.9V during VED mode. This option does allow for the possibility to remove the low noise LDO's in the microphone bias generators. This could save 0.03 mm^2 per bias generator. Additionally, there is not much area penalty supporting a fourth microphone and no additional pins or external circuits. The same bias generator can be used for analog and digital MEM microphones, and MEM microphones have many advantages over ECM microphones. However, if should be appreciated, if ECM support is needed with lowest VED power, the third design may be the next best (at least the 1.3V addition). Additionally, the first design can be added if needed at any time as long as there are GPIO's available.

Figure 28A:
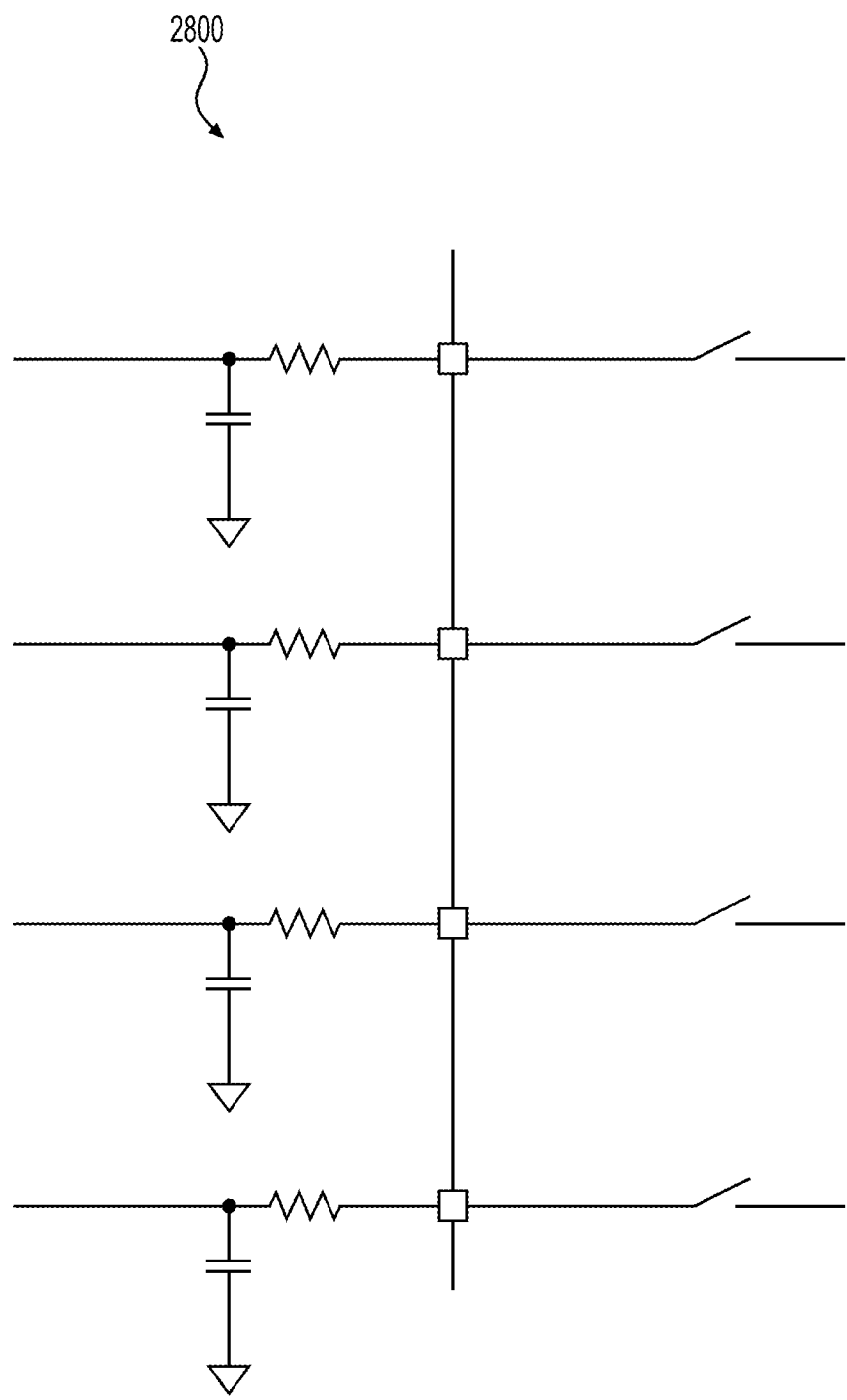
FIG. 28A illustrates a first multiple microphone bias generator according to one or more aspect of the disclosed subject matter.

FIG. 28A illustrates a first exemplary multiple microphone bias generator 2800 according to one or more aspect of the disclosed subject matter. If restricted to MEM microphones, all LDO's can be removed to save die area.

Figure 28B:
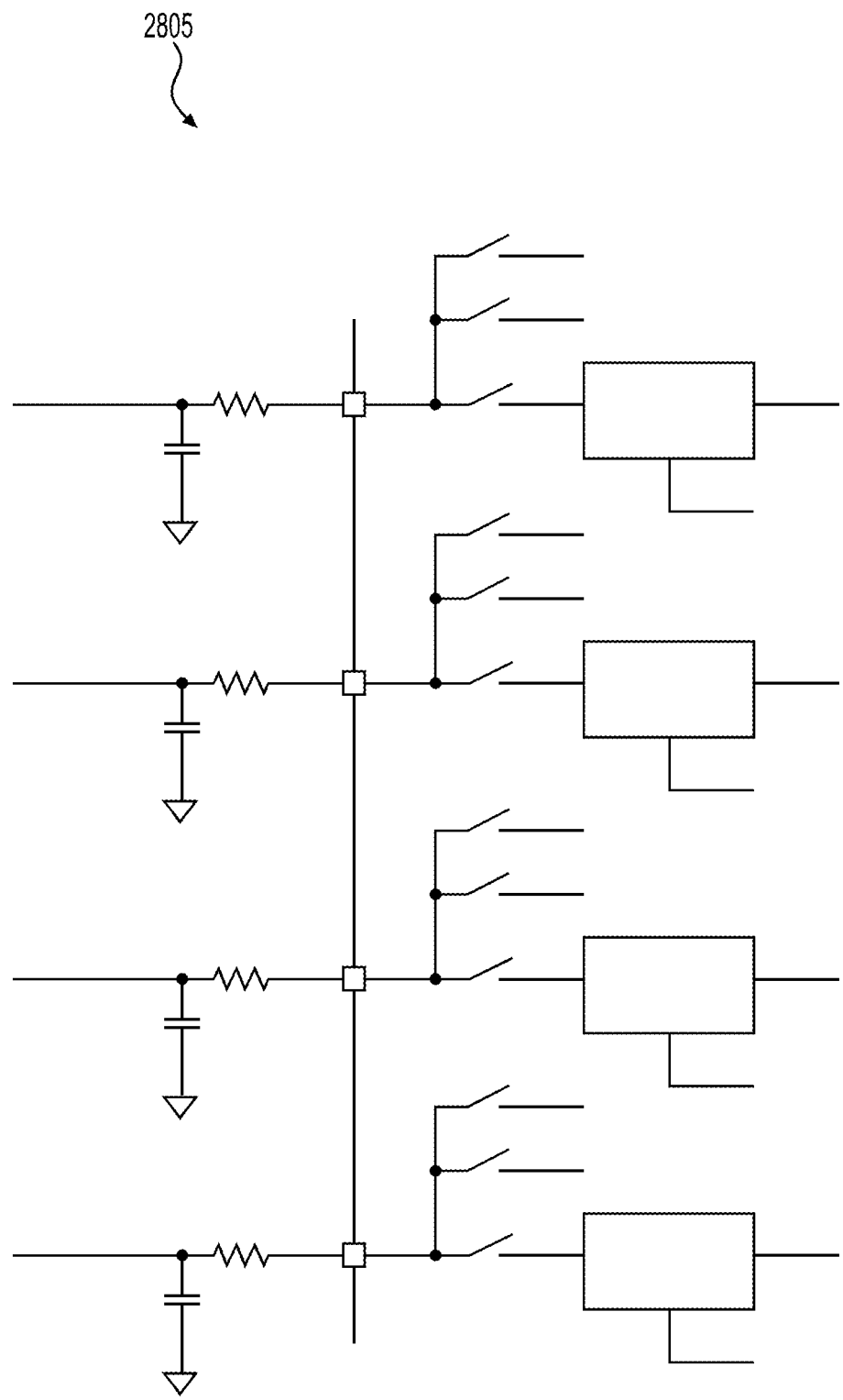
FIG. 28B illustrates a second multiple microphone bias generator according to one or more exemplary aspect of the disclosed subject matter.

FIG. 28B illustrates a second exemplary multiple microphone bias generator 2805 according to one or more aspect of the disclosed subject matter. The legacy approach may include 3× microphone bias circuits.

Figure 28C:
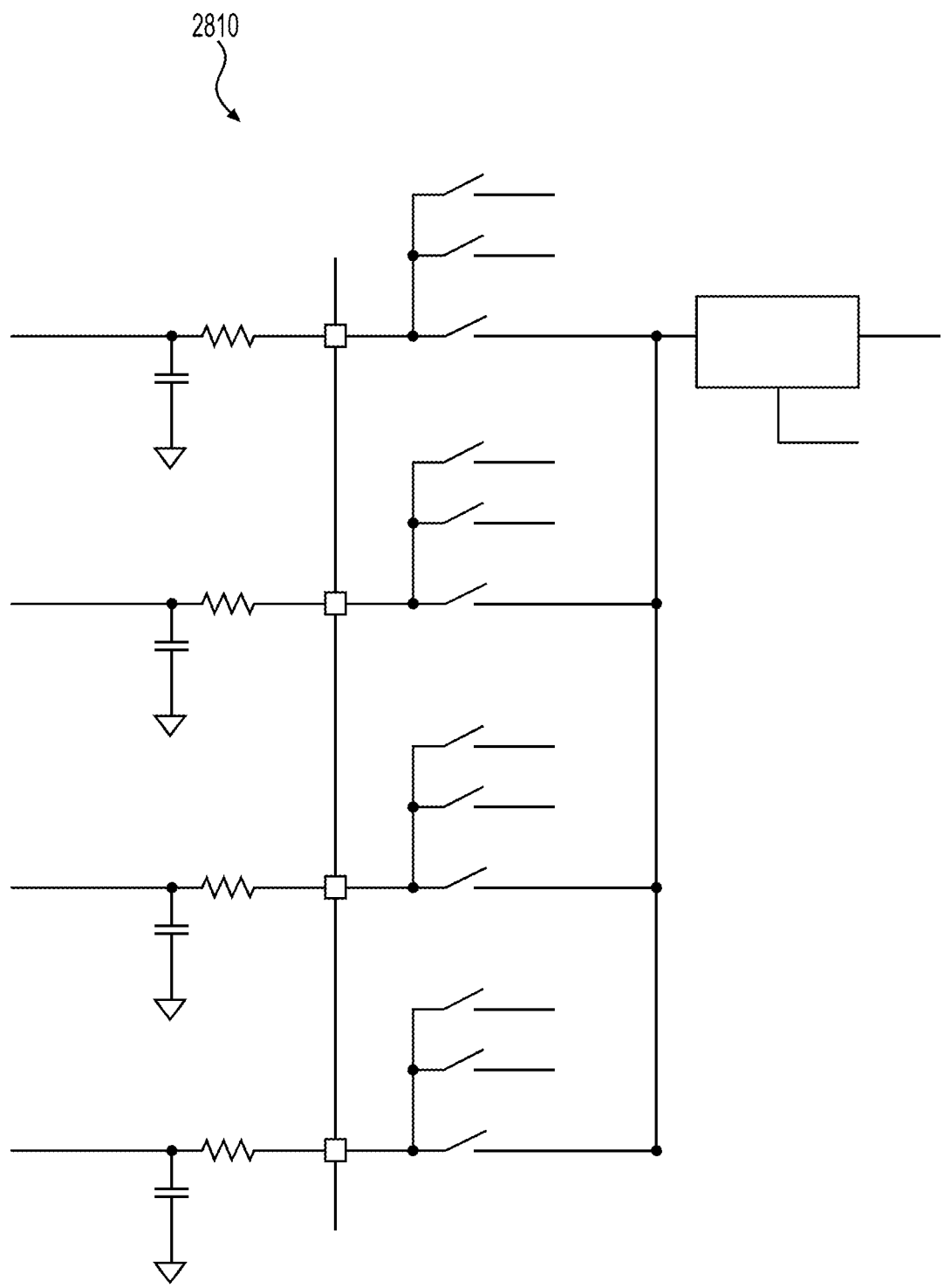
FIG. 28C illustrates a third multiple microphone bias generator according to one or more exemplary aspects of the disclosed subject matter.

FIG. 28C illustrates a third multiple microphone bias generator 2810 according to one or more aspect of the disclosed subject matter. For ECM microphones, LDOs can be eliminated by sharing, which can help die area and power. In one implementation, there could be enough cross talk isolation to be sufficient for operation. However, LDO may need to support greater than or equal to a 2 mA load. As one of ordinary skill will recognize, the elements depicted in FIGS. 28A-C are combinable with each other without limitation.

Figure 29:
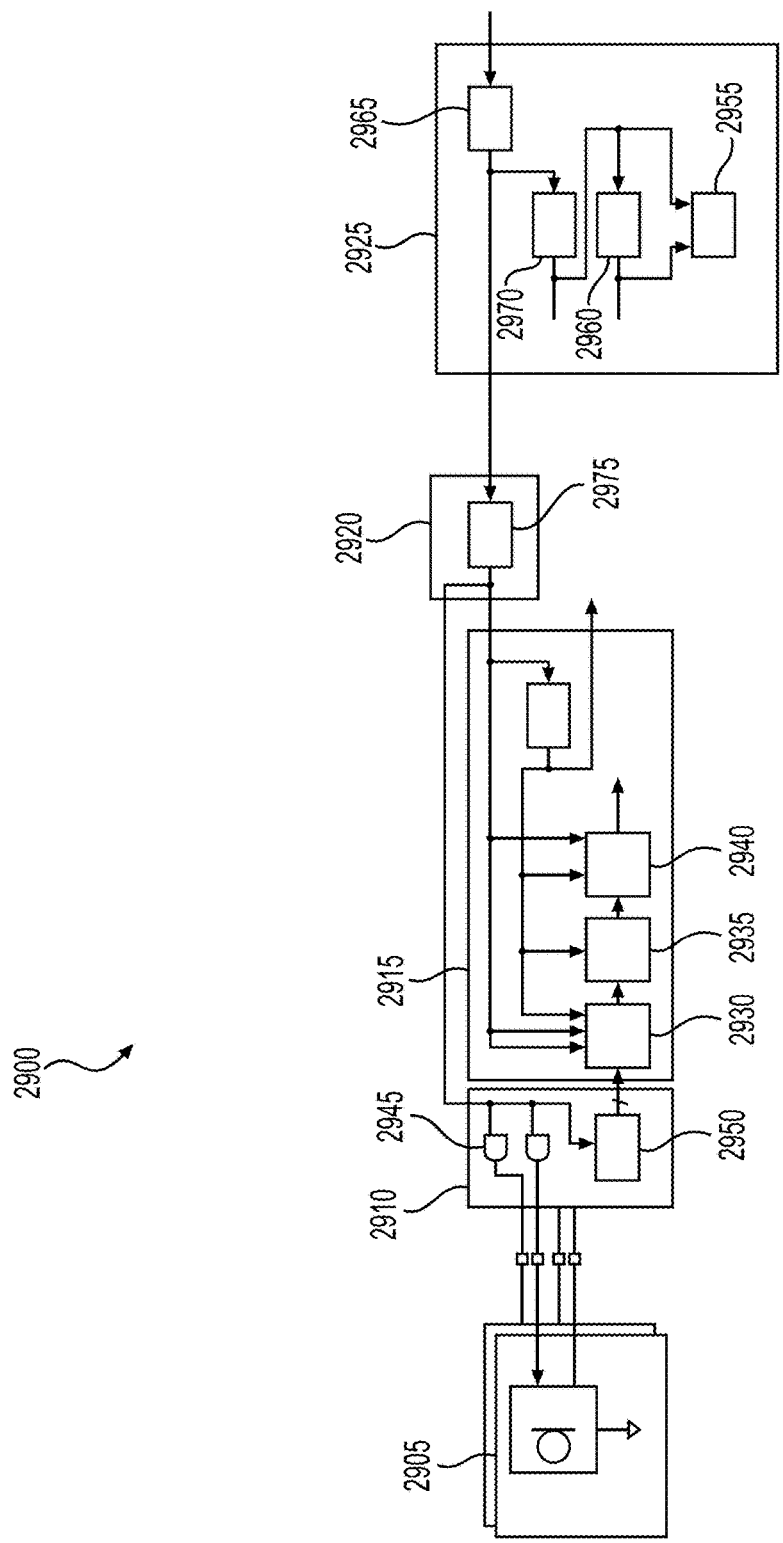
FIG. 29 illustrates a digital VED clocking diagram according to one or more exemplary aspects of the disclosed subject matter.

FIG. 29 depicts a digital VED clocking diagram 2900 according to one or more aspects of the disclosed subject matter. Generally, the VED clocking diagram 2900 can include a digital MEM microphone 2905 representing one or more digital MEM mics, an I/F block 2945 which can include one or more AND gates 2945 and a demultiplexer channel select block 2950, a DVED 2915 including a CIC decimator filter 2930, a digital VED front end 2935, and a VED algorithm 2940, a system on a chip (SoC) 2920 including a 1/N block 2975, and an analog front end (AFE) 2925 including an AVED2 2955, a 1/OSR A block 2960, a 1/M block 2960, and an frequency locked loop (FLL) high speed clock 2965.

Voice energy detection can have several advantages. Generally, providing power savings is a main advantage of VED. Further, multiple VEDs can be used to save power.

For example, in one implementation, turning on one of a plurality of microphones in a device based on the one microphone that has the most audio acoustic energy associated with it. As a result, a master microphone can be selected for VED processing to save power. Further, the microphones can be scanned periodically to find the microphone with the most energy and then select that microphone to be the master microphone. This way, the master microphone can be updated dynamically based on selecting the microphone with the most audio acoustic energy. The scanning can occur with a second VED that scans the other microphones to see if any of the other microphones have more audio acoustic energy than the current master microphone, and the master microphone can be updated accordingly if another microphone with more audio acoustic energy is found during a scan.

For example, in one implementation, processing for the wake work does not have to be done on the chip. More specifically, the detected wake word can be sent to an external server (e.g., cloud, server farm, etc.) to confirm whether or not the detected wake word is a good match. The external server can send a signal back to the chip to active high fidelity audio paths, turn on microphones, etc. and the rest of the high fidelity audio streams can go to the external server for additional back end processing. Accordingly, VED can correspond to a significant power savings because doing that processing locally can burn a significant amount of power.

Additionally, biasing the microphone can provide significant power savings. For example, considering M microphones and VED needs to be done for one or two of the microphones because if all bias generators are powered for all the microphones a wastes a huge amount of power is wasted. So for the lowest power solution, each microphone should have its own dedicated bias generator.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A voice energy detection (VED) device, comprising:
a plurality of microphones disposed in the device and configured to receive a sound input;
an electret condenser microphone (ECM) interface for at least one of the plurality of microphones;
a bias generator for each ECM interface, the bias generator being configured to transition from a voice energy detection mode to a normal audio capture mode, wherein the voice energy detection mode uses lower power than the normal audio capture mode; and
a VED circuit and a capture buffer configured to capture audio samples in parallel with the VED circuit, the VED circuit being configured to:
detect voice energy in the sound input received by a master microphone of the plurality of microphones,
detect a predetermined keyword when the detected voice energy is greater than a predetermined threshold using the captured audio samples stored in the capture buffer, and
process the received sound input using one or more of contextual and natural language processing in response to the predetermined keyword being detected; and
a second VED circuit configured to:
periodically scan the plurality of microphones for audio acoustic energy,
identify a microphone from the plurality of microphones that has higher audio acoustic energy than the master microphone,
turn on the identified microphone, and
update the master microphone to be the identified microphone.

2. The VED device of claim 1, wherein the predetermined keyword is a wake word configured to trigger interactive functionality in an electronic device.

3. The VED device of claim 1, wherein a first VED circuit is configured to
dynamically select the master microphone based on background energy, the master microphone having the highest audio acoustic energy.

4. The VED device of claim 1, wherein the VED circuit is configured to determine an average energy level of the sound input received by the one or more microphones.

5. The VED device of claim 4, wherein the VED circuit is connected to processing circuity, the processing circuitry configured to periodically wake up and adjust a VED threshold and input level based on the average energy level.

6. The VED device of claim 2, wherein output of the VED circuit for each of the plurality of microphones is combined, the combined output being configured to
increase detection probability of the wake word, and
reduce a false alarm rate, the false alarm corresponding to an incorrectly detected wake word.

7. The VED device of claim 6, wherein reducing the false alarm rate includes adjusting an input level and detection threshold based on false alarm rates.

8. The VED device of claim 1, wherein the VED circuit is further configured to
perform slope delta modulation filtering,
compare each sub band in a plurality of sub bands to any other sub band in the plurality of sub bands, the sub bands having different widths, center frequencies, and scale factors, and
compare differences from each sub band comparison with a detection threshold, and
identify a speech presence when there is a difference in speech energy between the sub bands.

9. The VED device of claim 1 wherein a resistor bias (Rbias) and a voltage bias (Vbias) are dynamically changed simultaneously.

10. A voice energy detection (VED) device, comprising:
a capture buffer configured to capture audio samples;
an electret condenser microphone (ECM) interface for at least one of a plurality of microphones;
a bias generator for each ECM interface, the bias generator being configured to transition from a voice energy detection mode to a normal audio capture mode, wherein the voice energy detection mode uses lower power than the normal audio capture mode; and
VED circuitry, the VED circuitry including a digital VED front end positioned between a cascaded integrator-comb (CIC) decimator filter and VED digital architecture, the digital VED front end being configured to receive input from the CIC decimator filter, the VED circuitry being configured to:
detect voice energy in the sound input received by a master microphone of the plurality of microphones disposed in the digital VED device,
detect a predetermined keyword when the detected voice energy is greater than a predetermined threshold using the captured audio samples stored in the capture buffer,
process the received sound input using one or more of contextual and natural language processing in response to the predetermined keyword being detected,
periodically scan the plurality of microphones for audio acoustic energy,
identify a microphone from the plurality of microphones that has higher audio acoustic energy than the master microphone,
turn on the identified microphone, and
update the master microphone to be the identified microphone.

11. The VED device of claim 10, wherein the predetermined keyword is a wake word configured to trigger interactive functionality in an electronic device.

12. The VED device of claim 10, wherein the VED circuitry is further configured to
dynamically select the master microphone based on background energy, the master microphone having the highest audio acoustic energy.

13. The VED device of claim 11, wherein output of the VED circuit for each of the plurality of microphones is combined, the combined output being configured to
increase detection probability of the wake word, and
reduce a false alarm rate, the false alarm corresponding to an incorrectly detected wake word, wherein reducing the false alarm rate includes adjusting an input level and detection threshold based on false alarm rates.

14. The VED device of claim 10, wherein the VED circuitry is further configured to
perform slope delta modulation filtering,
compare each sub band in a plurality of sub bands to any other sub band in the plurality of sub bands, the sub bands having different widths, center frequencies, and scale factors,
compare differences from each sub band comparison with a detection threshold, and
identify a speech presence when there is a difference in speech energy between the sub bands.

15. An analog voice energy detection (VED) device, comprising:
a capture buffer configured to capture audio samples from a plurality of microphones;
an electret condenser microphone (ECM) interface for at least one of the plurality of microphones;
a bias generator for each ECM interface, the bias generator being configured to transition from a voice energy detection mode to a normal audio capture mode, wherein the voice energy detection mode uses lower power than the normal audio capture mode; and
VED circuitry, the VED circuitry including
a slope delta ADC converter with a sub band difference post filter, the VED circuitry being configured to
detect voice energy in the sound input received by a master microphone of the plurality of microphones disposed in the analog VED device,
detect a predetermined keyword when the detected voice energy is greater than a predetermined threshold using the captured audio samples stored in the capture buffer,
process the received sound input using one or more of contextual and natural language processing in response to the predetermined keyword being detected,
periodically scan the plurality of microphones for audio acoustic energy,
identify a microphone from the plurality of microphones that has higher audio acoustic energy than the master microphone,
turn on the identified microphone, and
update the master microphone to be the identified microphone.

16. The VED device of claim 1, wherein the VED circuit is further configured to dynamically change an oversampling ratio (OSR) and a passband bandwidth as a function of a loudness of a background noise and desired signal levels.

17. The VED device of claim 2, wherein the VED circuit comprises:
a keyword detect circuit configured to wake-up and detect the wake word when the detected voice energy is greater than the predetermined threshold,
wherein, when the keyword detect circuit is late to wake-up, the wake word is detected using the captured audio samples in the capture buffer.

* * * * *